(12) United States Patent  
Huonker et al.

(10) Patent No.: US 11,407,062 B2  
(45) Date of Patent: Aug. 9, 2022

(54) LASER LINE ILLUMINATION

(71) Applicant: TRUMPF LASER GMBH, Schramberg (DE)

(72) Inventors: Martin Huonker, Dietingen (DE); Christoph Tillkorn, Villingendorf (DE); Stefan Dorer, Villingen (GH)

(73) Assignee: TRUMPF LASER GMBH, Schramberg (DE)

( * ) Notice: Subject to any disclaimer, the term of this patent is extended or adjusted under 35 U.S.C. 154(b) by 684 days.

(21) Appl. No.: 16/257,270

(22) Filed: Jan. 25, 2019

(65) Prior Publication Data

US 2019/0151987 A1 May 23, 2019

Related U.S. Application Data

(63) Continuation of application No. PCT/EP2016/067956, filed on Jul. 27, 2016.

(51) Int. Cl.  
*B23K 26/064* (2014.01)  
*B23K 26/06* (2014.01)  
(Continued)

(52) U.S. Cl.  
CPC ...... *B23K 26/0643* (2013.01); *B23K 26/0006* (2013.01); *B23K 26/0648* (2013.01);  
(Continued)

(58) Field of Classification Search  
CPC ........... B23K 26/0643; B23K 26/0648; B23K 26/0738; B23K 26/352; B23K 26/08;  
(Continued)

(56) References Cited

U.S. PATENT DOCUMENTS 5,796,521 A * 8/1998 Kahlert ............... G02B 27/09  
359/619  
6,341,042 B1 * 1/2002 Matsunaka ........ B23K 26/0648  
359/618  
(Continued)

FOREIGN PATENT DOCUMENTS

CN 202 904 125 4/2013  
DE 102009044751 6/2010  
(Continued)

OTHER PUBLICATIONS

International Preliminary Report on Patentability in International Application No. PCT/EP2016/067956, dated Feb. 7, 2019, 17 pages.  
(Continued)

*Primary Examiner* — Geoffrey S Evans  
(74) *Attorney, Agent, or Firm* — Fish & Richardson P.C.

(57) ABSTRACT

A laser system is configured for providing a laser line (L) in a working plane (WP) for line illumination of an object. The laser line (L) extends in a first direction (x) over a significant length and in a second direction (y) over a small extent. The laser system includes a laser source for providing a laser beam as basis for an elongated input laser beam propagating along a propagation direction (z), and a homogenization and focusing unit for homogenizing the elongated laser beam to form the laser line (L). The laser system is, for example, suitable for providing a laser line (L) that can be stitched to another laser line (L') of another laser system.

20 Claims, 12 Drawing Sheets

(51) Int. Cl.
- *B23K 26/073* (2006.01)
- *B23K 26/08* (2014.01)
- *G02B 27/09* (2006.01)
- *B23K 26/352* (2014.01)
- *B23K 26/00* (2014.01)
- *G02B 27/14* (2006.01)
- *G02B 19/00* (2006.01)
- *B23K 103/00* (2006.01)
- *H01S 3/00* (2006.01)
- *B23K 101/40* (2006.01)

(52) U.S. Cl.
CPC ...... *B23K 26/0652* (2013.01); *B23K 26/0738* (2013.01); *B23K 26/08* (2013.01); *B23K 26/352* (2015.10); *G02B 19/0028* (2013.01); *G02B 19/0052* (2013.01); *G02B 27/0927* (2013.01); *G02B 27/0972* (2013.01); *G02B 27/14* (2013.01); *B23K 2101/40* (2018.08); *B23K 2103/54* (2018.08); *B23K 2103/56* (2018.08); *H01S 3/005* (2013.01)

(58) Field of Classification Search
CPC .............. B32K 26/052; B32K 2103/54; G02B 27/0927; G02B 27/14; G02B 19/0052; G02B 19/0028
See application file for complete search history.

(56) References Cited

U.S. PATENT DOCUMENTS

| | | |
|---|---|---|
| 6,765,725 B1 | 7/2004 | Fermann et al. |
| 2001/0012651 A1 | 8/2001 | Yamazaki et al. |
| 2002/0163730 A1 | 11/2002 | Sugiyama et al. |
| 2003/0128543 A1 | 7/2003 | Rekow |
| 2007/0268572 A1 | 11/2007 | Hu et al. |
| 2008/0137707 A1 | 6/2008 | Mikliaev et al. |
| 2011/0157706 A1* | 6/2011 | Mitra ................ G02B 27/0905 359/619 |
| 2012/0057345 A1 | 3/2012 | Kuchibhotla |
| 2012/0127723 A1* | 5/2012 | Mikhailov ......... G02B 27/0927 362/259 |
| 2015/0177525 A1* | 6/2015 | Shudo ................ G02B 27/0961 359/639 |
| 2016/0241001 A1 | 8/2016 | Dubost et al. |
| 2017/0219835 A1 | 8/2017 | Zambuto et al. |

FOREIGN PATENT DOCUMENTS

| | | |
|---|---|---|
| EP | 0731932 | 5/1999 |
| EP | 2 113 332 | 11/2009 |
| EP | 1896893 | 8/2013 |
| JP | 2001 156017 | 6/2001 |
| JP | 2012/047766 | 3/2012 |
| WO | WO 2005/085934 | 9/2005 |
| WO | WO 2006/066687 | 6/2006 |
| WO | WO 2007/122061 | 11/2007 |
| WO | WO 2012/166758 | 12/2012 |
| WO | WO 2015/036427 | 3/2015 |
| WO | WO 2018/019374 | 2/2018 |

OTHER PUBLICATIONS

International Search Report and Written Opinion in International Application No. PCT/EP2016/067956, dated Jun. 2, 2017, 21 pages.
CN Office Action in Chinese Appln. No. 201680088011.7, dated Dec. 15, 2020, 15 pages (with English translation).
Lichtenstein et al., "Scalable high power line focus diode laser for crystallizing of silicon thin films," Physics Procedia, Jan. 1, 2010, 5:109-17.

* cited by examiner

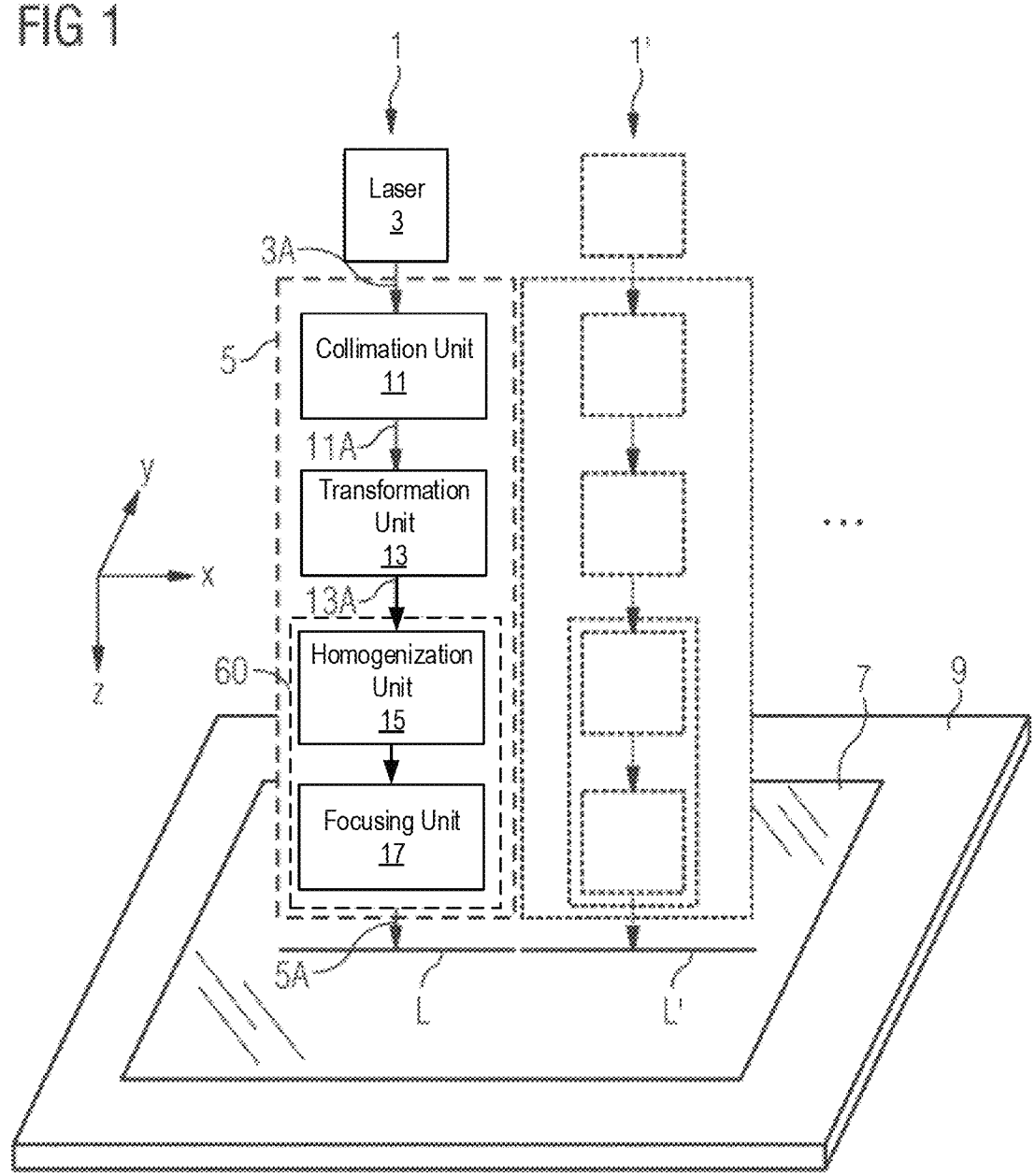

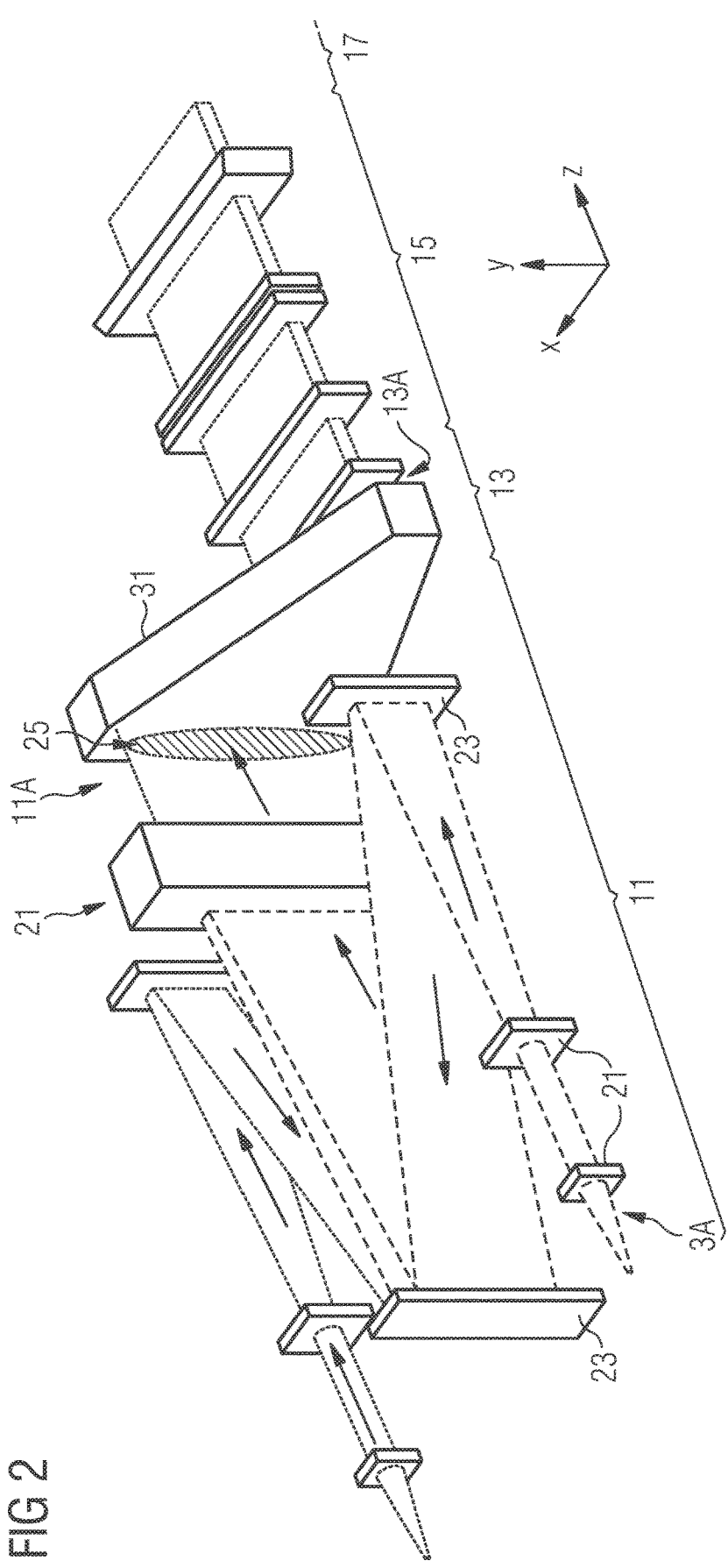

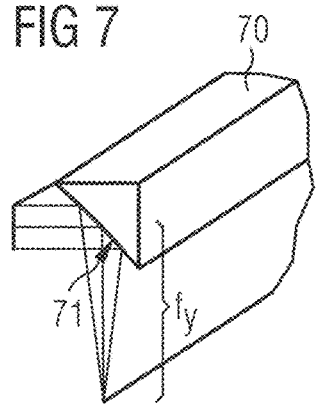
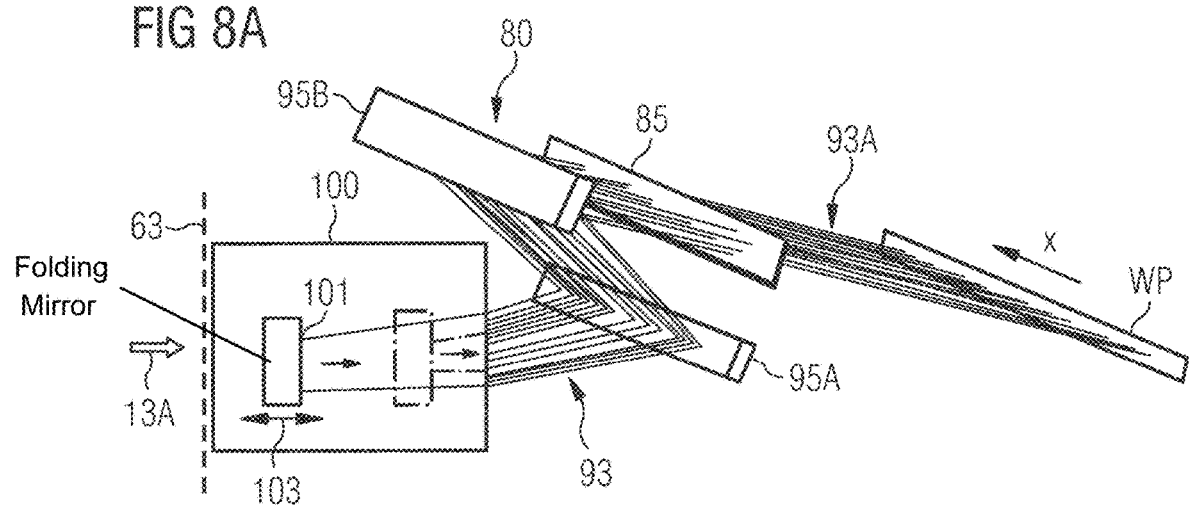
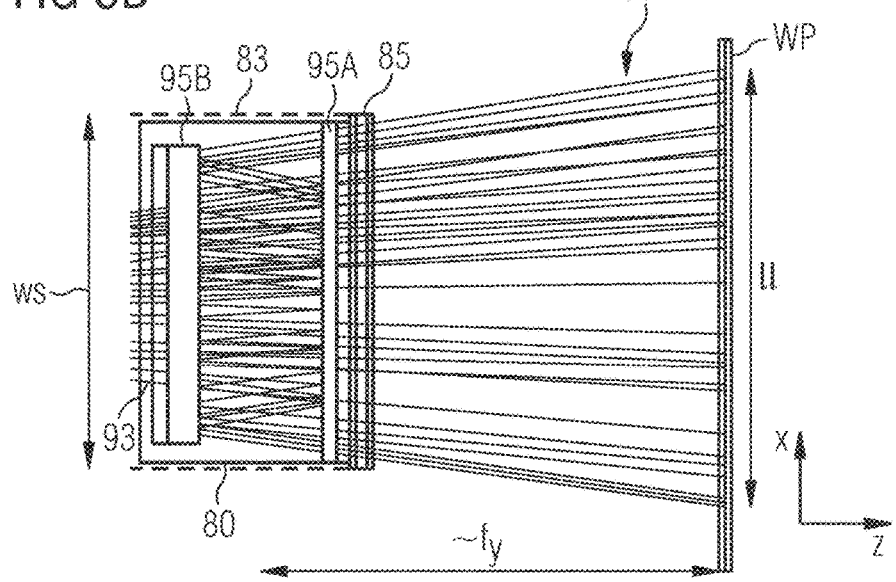

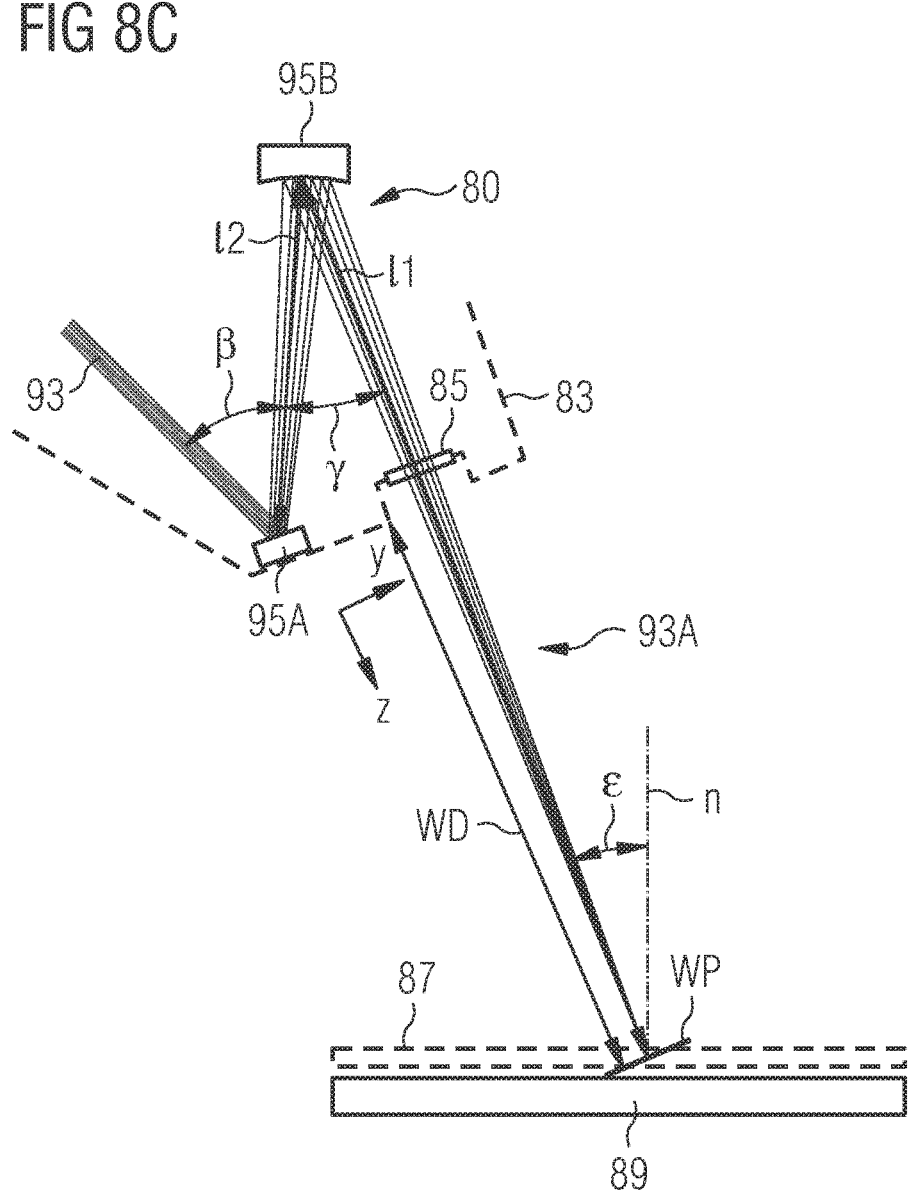

LASER LINE ILLUMINATION

CROSS REFERENCE TO RELATED APPLICATION

This application is a continuation of and claims priority under 35 U.S.C. § 120 from PCT Application No. PCT/EP2016/067956 filed on Jul. 27, 2016, the entire contents of which is incorporated herein by reference.

TECHNICAL FIELD

The present disclosure relates generally to laser systems, for example, to laser systems for optically providing a line shape illumination. Moreover, the present disclosure relates generally to beam transformation and beam homogenization within line optics systems.

BACKGROUND

In specific applications, laser systems are used to provide homogenous line-shaped intensity distributions in a respective focus zone. Such a focus zone is herein also referred to as a laser line (-shaped) focus or briefly a laser line. Exemplary applications using such a laser line focus include laser processing such as recrystallization of silica layers deposited on glass substrates for use in, for example, TFT (Thin-Film Transistor) displays, laser based doping of, for example, solar cells, and laser lift off processes used in, for example, microelectronic device production. An exemplary process applying a laser line focus for modifying metallic nanoparticles is disclosed in WO 2015/036427 A1.

Respective laser systems aim at providing intensity distributions with large to very large aspect ratios of the beam diameters in two orthogonal directions of the beam profile (i.e., orthogonal to the beam propagation directions), while at the same time ensuring a large depth of focus in the direction of the smaller beam diameter.

EP 1 896 893 B1 discloses an optical configuration for the generation of a line-shaped intensity distribution based on a transformation of the light of a Nd-YAG-laser source. Furthermore, EP 0 731 932 B1 discloses an optical configuration for the beam shaping of a diode laser bar or the beam re-stacking of the light of a stack of diode laser bars such that it provides for an output beam with equal beam quality factors across the output beam. A similar combination of light sources to provide a pump laser beam is disclosed in WO 2012/166758 A1.

SUMMARY

The present disclosure relates to optical systems for providing a laser beam with a line-shaped intensity distribution with a large aspect ratio and a large depth of focus in a direction of a smaller extent of the beam. Moreover, it is an object to achieve a large homogeneity of the intensity distribution along the direction of the larger extent of the beam, i.e., along the "line" formed by the line-shaped intensity distribution. In some aspects, to the disclosure provides laser systems that allow scaling the length of the line by arraying two or more laser lines with line-shaped intensity distributions, for example, to provide a laser line with an adaptable line length.

In a first aspect, the disclosure features a beam transformation unit for transforming an input laser beam into a transformed beam with reduced spatial and/or temporal coherence that can, for example, be used in laser systems for line illumination of an object. The beam transformation unit includes a transformation optics made of a transparent monolithic plate-shaped optical element that has a front face and a back face. The front and back faces extend essentially in parallel at a distance with respect to each other. The front face includes an input surface area for receiving the input laser beam, and a front reflecting area. The input surface area extends in an elongated manner in a pre-transformed direction next to the front reflecting surface area. The back face includes, for exiting the output laser beam, an output surface area extending in an elongated manner in a transformed direction next to a back reflecting surface area. The transformed direction differing from the pre-transformed direction. Moreover, the beam transformation unit is configured such that the front reflecting surface area and the back reflecting surface area guide a plurality of input beam segments of the input laser beam that have entered the transformation optics through the input surface area, to exit through the output surface area. The guiding of the plurality of input beam segments is performed by reflecting the input laser beam within the transformation optics. Neighboring input beam segments that exit the output surface area are re-sorted into output beam segments that differ in the numbers of reflections they have undergone, thereby providing different optical path lengths to the output beam segments inside the beam transformation optics.

In another aspect, a laser system is disclosed for providing a transformed beam with reduced spatial and/or temporal coherence that can, for example, be used for line illumination of an object with a laser line extending in a first direction. The laser system includes a laser source for providing a laser beam as an input laser beam propagating along a propagation direction, and a beam transformation unit including a transformation optics made of a transparent monolithical plate-shaped optical element that includes a front face and a back face. The front face and the back face extend essentially in parallel at a distance with respect to each other. The front face includes, for receiving the input laser beam, an input (first) surface area. The back face includes, for exiting the output laser beam, an output (second) surface area. The transformation unit is oriented with respect to propagation direction such that the input laser beam enters the input surface area under a tilt angle with respect to the normal vector of the front face. The tilt angle is selected such that the input laser beam enters the transformation optics through the input surface area, and is guided by reflection at a front reflecting surface area of the front face and at a back reflecting surface area of the back face within the transformation optics to exit through the output surface area. Moreover, neighboring input beam segments are re-sorted into output beam segments that are distinguished by the numbers of reflections undergone, thereby providing different optical path lengths to the output beam segments.

In another aspect, a homogenization and focusing unit is disclosed for homogenizing an elongated laser beam to form a laser line extending in a first direction to be used, for example, in an arrangement of laser systems for line illumination of an object. The homogenization and focusing unit includes a focusing unit that has a short axis focusing element that is active in a second direction, thereby defining the position of a working plane of the laser line in a propagation direction of the laser beam at its focal plane. The homogenization and focusing unit includes a homogenization unit configured to superimpose portions of the elongated laser beam arranged in the first direction along the elongated laser beam at a focal plane of the homogenization unit. Moreover, the position of the working plane in the propagation direction is selected to differ from the position of the focal plane of the homogenization unit so that an intensity distribution of the laser line provides a top-hat-shape with a plateau that is delimited by slopes at each side. For example, the plateau may extend at the most over 95% of a full width at half maximum of the intensity distribution.

In another aspect, a laser system is disclosed for providing a laser line in a working plane for line illumination of an object, the laser line extending in a first direction over a significant length and in a second direction over a small extent. The laser system includes a laser source for providing a laser beam as basis for an elongated input laser beam propagating along a propagation direction, and a homogenization and focusing unit for homogenizing the elongated laser beam to form the laser line. The homogenization and focusing unit includes a focusing unit that has a short axis focusing element that is active in the second direction, thereby defining the position of the working plane of the laser line in the propagation direction of the laser beam at the focusing element's focal plane. The homogenization and focusing unit includes a homogenization unit configured to superimpose portions of the elongated laser beam arranged in the first direction along the elongated laser beam at a focal plane of the homogenization unit. The position of the working plane in the propagation direction is selected to differ from the position of the focal plane of the homogenization unit such that an intensity distribution of the laser line provides a top-hat-shape with a plateau that is delimited by slopes at each side. For example, the plateau may extend at the most over 95% of a full width at half maximum of the intensity distribution.

In another aspect, a combined laser system for laser processing of an object with a combination of stitched laser lines includes a plurality of essentially identical laser systems as described herein. The neighboring laser systems are displaced in the first direction at least by a distance corresponding to the width of the slope of intensity distributions of the laser systems, thereby allowing overlaying neighboring slopes in a respective transition zone and forming an extended laser line with a flat summarized intensity in the first direction.

In another aspect, the disclosure features methods for stitching laser lines to form a stitched laser line extending in a first direction. The methods include: for at least two elongated laser beams, superimposing portions of respective elongated laser beams arranged in the first direction at a focal plane using a long axis focusing element, and focusing each elongated laser beam in a second direction using a short axis focusing element to define, in a propagation direction, a common working plane within a respective focus zone in the second direction. The position of the working plane in the propagation direction is selected to differ from the position of the focal plane. The methods further include aligning the at least two elongated laser beams side to side in the first direction, thereby forming, in the common working planes, the stitched laser line with a summarized intensity.

In another aspect, a homogenization and focusing unit is disclosed for adapting the length of a laser line formed by an elongated laser beam, the laser line extending in a first direction. The homogenization and focusing unit includes a homogenization unit and a focusing unit. The homogenization unit is configured to superimpose portions of the elongated laser beam arranged in the first direction along the elongated laser beam at a focal plane of the homogenization unit. The focusing unit includes a short axis focusing element that is active in a second direction, thereby defining a position of the working plane of the laser line in a propagation direction of the laser beam at the focal plane of the short axis focusing element. Moreover, the laser beam is divergent in the first direction between the homogenization unit and the focusing unit.

The forgoing aspects are associated with embodiments as recited in the dependent claims, which are incorporated in the description herein by reference. It is noted that embodiments disclosed in dependent claims and associated with a respective aspect will be understood by the skilled person to apply to other aspects mentioned herein as well as other aspects being part of the present disclosure.

In some embodiments, the laser systems include a laser source that is configured to provide a multimode laser beam having a substantially symmetric beam parameter product.

In some embodiments, the laser systems further include a beam transformation unit for transforming a multimode laser beam emitted by the laser source. The beam transformation may re-sort beam segments of the beam cross-section, which is herein also referred to as mode transformation. Due to the beam transformation, the beam parameter product, and for example, the $M^2$-value (also known as $M^2$ factor), is increased in a first direction (x-direction), which is orthogonal to the beam propagation direction, and is decreased in a second direction (y-direction), which is orthogonal to the beam propagation direction and the first direction. The mode transformation may reduce the beam quality in one direction and at the same time increase the beam quality in the other orthogonal direction. The beam transformation as proposed in this application especially may result in a decrease of the spatial and/or temporal coherence of the radiation that has entered the beam transformation unit to provide a transformed output radiation. That output radiation is herein referred to as a radiation beam, as a transformed radiation or, for simplicity, as a laser beam. The beam transformation can result in a reduction of interference when a larger number of modes contribute to a further beam homogenization step.

In some embodiments of the beam transformation unit, two reflective surfaces are arranged with respect to the incoming laser beam such that beam segments of the laser beam get resorted due to reflections of the laser beam from the reflective surfaces. In some embodiments, the reflective surfaces may be formed using the surfaces of a transparent, for example, monolithic plate-shaped, optical element. The thickness of the plate-shaped optical element is selected such that, for a specific angular orientation (defining the optical paths of the beam segments within the optical element), the individual beam segments that leave the optical element experience optical path length differences that are larger than a coherence length of the incoming laser beam.

In such configurations, the resulting difference in optical path length contributes further to the homogeneity of the output beam as it reduces—besides the spatial coherence due to the mode transformation—also the temporal coherence of the laser beam. The individual beam segments travel for different time periods within the transformation unit such that the temporal coherence is reduced. As the phase relation between the beam segments is at least partly lost, coherent interference is less likely when the beam segments overlap in the focus zone.

The output radiation of the beam transformation unit with its reduced spatial and temporal coherence across the long axis of the line-shaped beam is suited for being input into a beam homogenization unit. Therein, homogenization can be achieved by a Fourier lens (long axis focusing element) for superposing the beam segments at the Fourier plane. Any coherence of beam portions being superposed can result in irregularities within the intensity distribution of the resulting laser line, such as a creation of intensity peaks. The degree of interference ("interference contrast") depends on any spatial and temporal coherence of the interfering radiation. The degree of interference decreases with an increasing number of superposed modes contributing to the homogenized radiation, e.g. decreases with a reduction of spatial coherence of the radiation. Moreover, the degree of interference decreases with a decrease in the temporal coherence (coherence length) of the radiation due to cancellation of the phase relation between radiation portions. Accordingly, the beam transformation unit proposed herein may, for example, be used for generating uniform laser lines.

The advantages of the concepts of an optomechanical (simple) setup disclosed herein include a flexibility in the radiation intensity range due to the macroscopic dimensions of the beam transformation unit, without any intermediate focus of the beam, and an increase in beam quality that is essentially limited by the diffraction at the exit aperture of the beam transformation unit.

The concepts disclosed herein can relate to high-throughput laser processing with a high power/high energy laser beam, for example, to laser processing applications including annealing/recrystallization of thin films deposited on glass, annealing of semiconductors, and cladding. Laser sources used may provide coherent radiation in the wavelength range extending from the (near) ultraviolet to the (near) infrared, which can be generated using, for example, Yb-based solid state lasers, excimer lasers, and diode lasers. The laser sources may, for example, be operated in a continuous-wave ("cw") mode or a pulsed mode.

Other features and aspects of this disclosure will be apparent from the following description and the accompanying drawings.

DESCRIPTION OF DRAWINGS

The accompanying drawings, which are incorporated herein and constitute a part of the specification, illustrate exemplary embodiments of the disclosure and, together with the description, serve to explain the principles of the disclosure. In the drawings:

FIG. 1 is a schematic illustration of a laser system for generating a laser line for laser processing.

FIG. 2 is a perspective drawing showing exemplary optical embodiments for a collimation unit, a transformation unit, and a homogenization unit that can be used in the laser system of FIG. 1.

FIG. 7 is a perspective drawing of a first embodiment of a short axis focusing element allowing stitching of laser lines.

FIGS. 8A to 8C are schematic illustrations of a second embodiment of a short axis focusing element allowing stitching of laser lines.

DETAILED DESCRIPTION

Figure 3A:
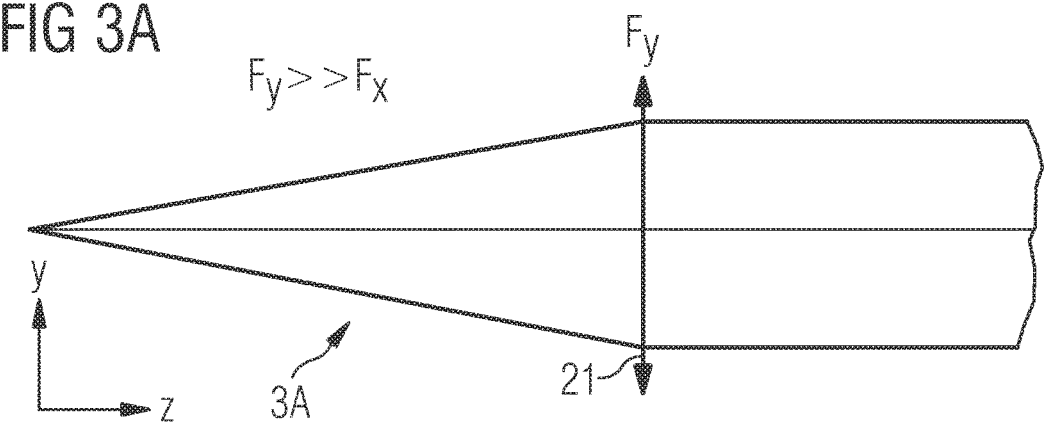
FIGS. 3A to 3C are schematic illustrations of embodiments and principles relating to collimating light that, for example, can be applied in the collimation unit of FIG. 2.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that to provide a homogeneous laser line, spatial and temporal coherence within the laser beam should be reduced.

The disclosure is further based in part on the realization that the combination of laser lines for generating an extended laser line can be achieved by proper selection of the working plane associated with the individual laser lines being combined.

Referring to FIGS. 1 and 2, a laser system 1 for generating a laser line to be used, for example, for a laser processing procedure includes a laser source 3 for generating a laser beam 3A and an optical system 5. Optical system 5 receives laser beam 3A and outputs a radiation beam 5A that allows forming a laser line L within an associated focus zone. The intensity distribution across radiation beam 5A in the focus zone is such that laser line L extends linearly primarily in, for example, x-direction to a desired extent, while laser line L is strongly reduced in width in y-direction. Herein, x- and y-directions extend orthogonally with respect to each other and with respect to a beam propagation direction (the beam propagation direction is assumed to extend along z-direction) as schematically indicated in FIG. 1.

Laser line L is focused onto, for example, an object 7 such as a specific material, e.g., glass or a semiconductor material. Object 7 is supported by a mount 9 and, generally, laser line L and object 7 can be moved with respect to each other such that a desired area is illuminated by laser line L. As further indicated in FIG. 1, a plurality of laser systems 1 can be provided next to each other to form together an extended laser line composed of a sequence of laser lines L, L'.

Laser source 3 may be a source for generating coherent radiation such as a laser beam in the wavelength range extending from the (near) ultraviolet to the (near) infrared such as specifically in ranges from 300 nm to 350 nm, 500 nm to 530 nm, or 900 nm to 1070 nm, which can be generated using, for example, Yb-based solid state lasers, excimer lasers and diode lasers. The coherent radiation is characterized by its beam quality, e.g., by $M^2$-values in x- and y-direction, respectively. The beam quality may be symmetrical, i.e. have essentially identical $M^2$-values in x-direction and in y-direction or those $M^2$-values may be essentially identical or differ to some extent. In some embodiments disclosed herein, it is assumed that, if there is a difference, a better beam quality is given in y-direction than in x-direction (e.g. $M^2_x = a \cdot M^2_y$).

Laser beam 3A may be provided to optical system 5 using a fiber transmission or a free space transmission. Laser source 3 may be, for example, a fiber coupled diode laser or a multimode solid state laser, both being able to provide a laser beam with beam parameter products that are essentially symmetrical around the propagation direction. Laser source 3 may be, for example, a multimode disk laser with a central wavelength of 1030 nm. A 200 μm fiber having a numerical aperture (NA) of 0.11 may allow generating laser beam 3A with a beam parameter product BPP of 10 mm mrad. The coherence length of a laser beam can be determined according to $l_c = \lambda^2/\Delta\lambda$, with $\Delta\lambda$ being the spectral width and $\lambda$ being the wavelength of the solid state laser. The above exemplarily mentioned disk laser has a coherence length $l_c$ of approx. 0.5 mm.

Referring to the initial discussion of the influence of the temporal coherence on the homogeneity of the intensity distribution in the focus zone, using an optical plate with a thickness in the mm-range in optical system 5 may generate optical path length differences between beam segments that are sufficient to reduce the temporal coherence in the desired extent as will be explained below in connection with FIGS. 4A to 4H.

As illustrated by separate boxes in FIG. 1, in one example, optical system 5 includes a collimation unit 11 (optional), a beam transformation unit 13, a homogenization unit 15, and a focusing unit 17 (optional, provided separately or integrated in optical elements of, for example, homogenization unit 15, thereby forming a homogenization and focusing unit 60).

The optical configurations of those units are designed to generate, from laser beam 3A, radiation beam 5A with its line-shaped intensity distribution having a high aspect ratio (e.g. in the range from 10 to 100 such as 60 for single beam or 30 for dual beam configurations) and, at the same time, with a large depth of focus in the direction of the smaller beam diameter in the focus zone.

To simplify and improve the transformation, collimation unit 11 may be used to provide an elliptical beam shape with respective divergence in the x- and y-directions as an input beam shape for beam transformation unit 13. Beam transformation unit 13 is configured to re-sort beam segments of the input beam cross-section that are arranged along y-direction into beam segments arranged in x-direction to form an output beam shape of beam transformation unit 13. The output beam is thereby advantageously designed to allow, for example, homogenization unit 15 to work efficiently.

Referring to FIGS. 2 and 3A to 3C, exemplary collimation unit 11 includes a folded anamorphic optical arrangement that has a plurality of lenses 21 (cylindrical and spherical lenses) and folding mirrors 23. Laser beam 3A exiting, for example, a fiber (not shown) is shaped into a collimated laser beam 11A with an intensity distribution having an elliptical shape.

Figure 3B:
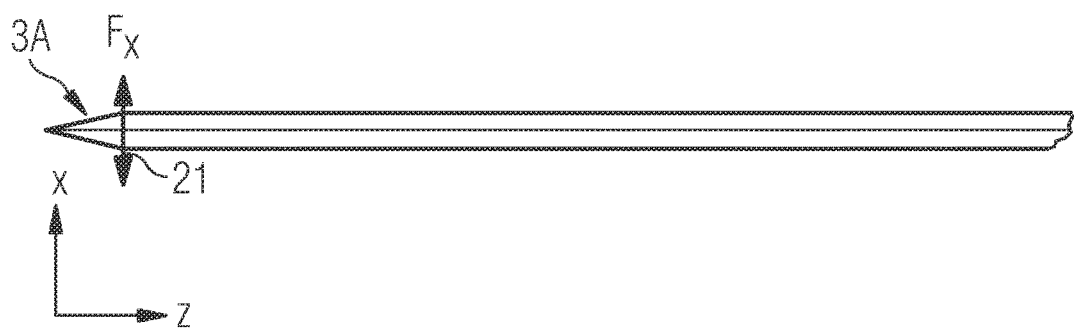
Figure 3C:
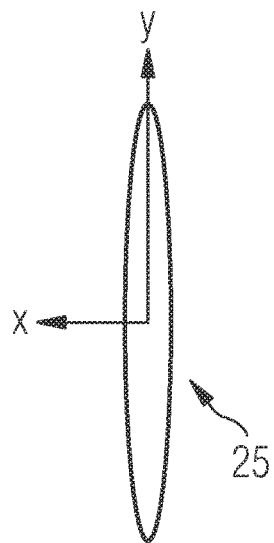

FIGS. 3A and 3B illustrate the generic beam shaping and collimating in the y-z-plane and the x-y-plane, respectively. For example, a collimation focal length $F_{c,y}$ in the y-direction is indicated significantly larger than a collimation focal length $F_{c,x}$ in x-direction. For laser beam 11A, FIG. 3C illustrates the elliptical beam profile 25 where the long axis of the ellipse extends in y-direction and the short axis of the ellipse extends in x-direction. Due to the elliptical shape, the divergence characteristic of laser beam 11A is such that the divergences in the x- and y-directions have the opposite ratio with respect to the respective beam diameters along the x- and y-directions.

In general, laser beam 11A is designed to allow for favorable and compact dimensions of beam transformation unit 13. For example, the beam waist in the x-direction and/or the beam waist in y-direction of laser beam 11A may be positioned close to or within beam transformation unit 13. For example, at least the beam waist in the x-direction may be located at an entrance aperture of beam transformation unit 13. For completeness, it is noted that the elliptical shape of laser beam 11A may be less sensitive to beam alignment and positional sensitivity than a circular shape of the beam and, thus, may require less measures with respect to beam alignment and stabilization.

As further indicated by dotted lines in FIG. 2, two or more laser beams may be combined as input for beam transformation unit 13 to allow for larger beam intensities.

Referring to FIGS. 2 and 4A to 4H, beam transformation unit 13 uses a specific reflective configuration for re-sorting (input) beam segments 27 of collimated laser beam 11A.

Figure 4A:
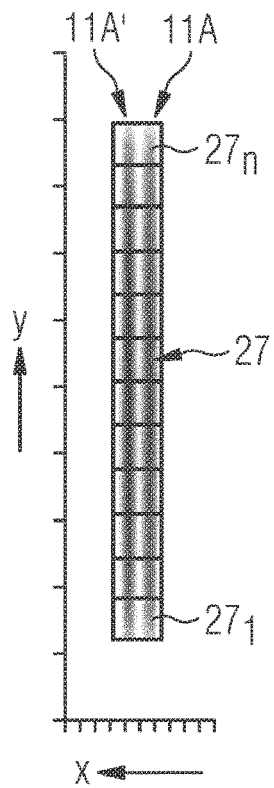
FIGS. 4A to 4H are schematic illustrations of embodiments and principles relating to beam transformation that, for example, can be applied in the transformation unit of FIG. 2.
Figure 4B:
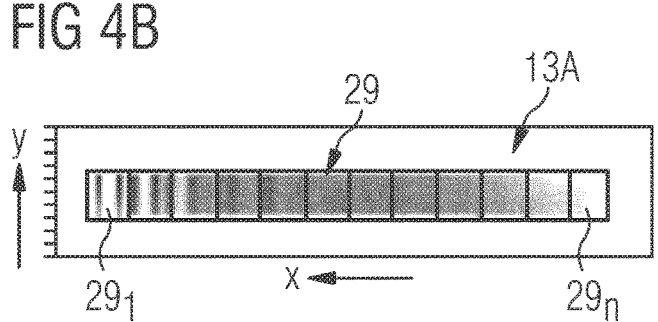

The function of the beam transformation is illustrated with respect to FIGS. 4A and 4B for the case of two laser beams 11A, 11A' being input into beam transformation unit 13. As shown in FIG. 4A, a first input beam segment $27_1$ corresponds to the lowest (in y-direction) portion of laser beam 11A, while an nth input beam segment $27_n$ corresponds to the highest (in y-direction) portion of laser beam 11A.

FIG. 4B illustrates re-sorted (output) beam segments 29 associated to a transformed beam 13A prior to passing any further optics. A first re-sorted beam segment $29_1$ corresponds to first input beam segment $27_1$ that has passed beam transformation unit without any reflection, i.e., its optical path in the beam transformation unit is the shortest with respect to the other re-sorted beam segments. The sequence of input beam segments arranged next to each other in the y-direction is re-arranged side to side along the x-direction in transformed beam 13A, up to an nth re-sorted beam segment $29_n$ corresponding to nth input beam segment $27_n$ forming the opposing lateral end portion of transformed beam 13A.

The transformation within beam transformation unit 13 generally reduces the beam quality in the x-direction and at the same time increases the beam quality in the y-direction.

Figure 4C:
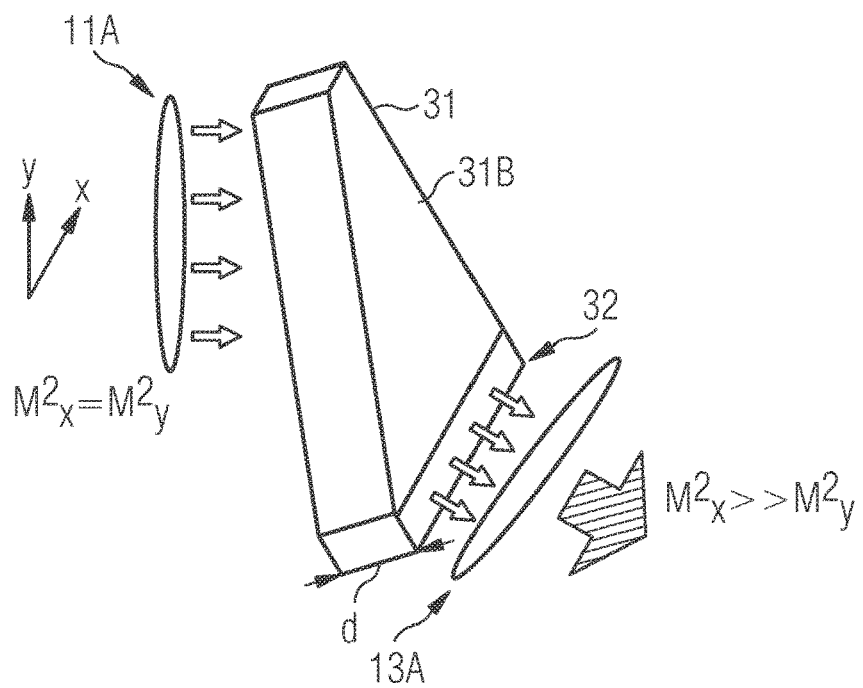
Figure 4D:
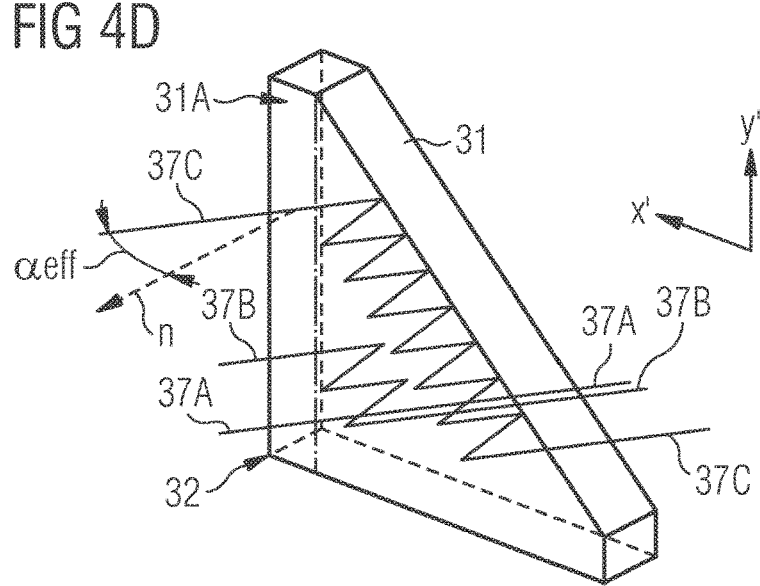
Figure 4E:
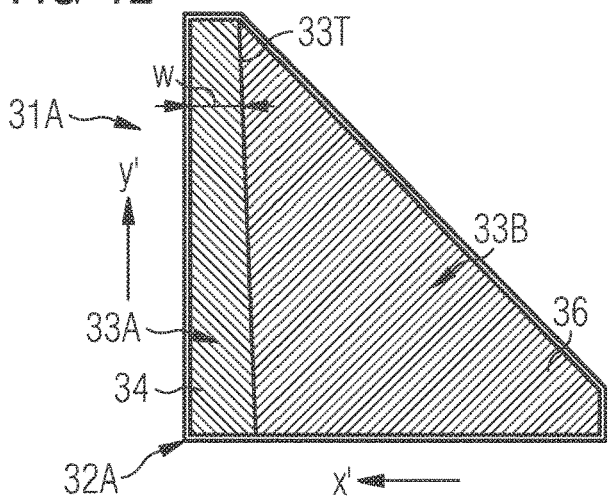
Figure 4F:
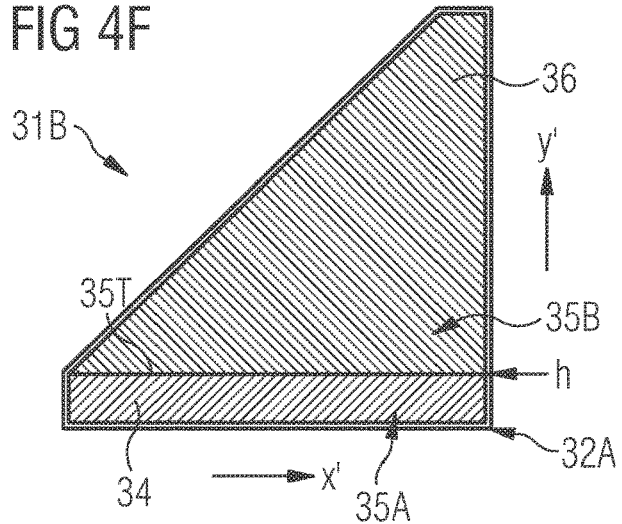

FIGS. 4C and 4D illustrate the beam transformation based on an exemplary transformation optics 31, and FIGS. 4E and 4F illustrate side views of transformation optics 31 and applied coatings.

Transformation optics 31 is a solid optical transmitting plate-like material with a thickness d. Transformation optics 31 has a front face 31A and a back face 31B in a substantially triangular shape with two, for example, orthogonal long sides originating from a common edge 32. The orientations of the two long sides is indicated in FIGS. 4D to 4F by x' and y' to indicate that, in the mounted state, transformation optics 31 is tilted with respect to the x- and y-directions. Front face 31A and back face 31B are essentially parallel with respect to each other. It is noted that the exemplarily shown triangular base shape is particularly compact as it only provides material where needed.

A first (input) surface area 33A of front face 31A extends along the one of the long sides, which extends in y'-direction (in this context also referred to as pre-transformed direction), e.g. slightly tilted with respect to y-direction, and is used for receiving laser beam 11A. Input surface area 33A forms an entrance aperture of beam transformation unit 13

(see also FIG. 4E). A second (output) surface area 35A of back face 31B extends along the other long side, which extends essentially in the x'-direction (in this context also referred to as transformed direction), e.g., slightly tilted with respect to the x-direction, and is used for exiting laser beam 13A. Output surface area 35A forms an exit aperture of beam transformation unit 13 (see also FIG. 4F).

Input and/or output surface areas 33A, 35A can have anti-reflective coatings 34 applied thereon and are dimensioned in accordance with the input beam size and the expected output beam size, the latter corresponding essentially to the input beam size. In the embodiments of examples shown in the figures, input surface area 33A extends orthogonal with respect to the extension of the output surface area 35A. Input and output surface areas 33A, 35A overlap in an edge region 32A such that—even in the tilted orientation with respect to the x- and y-directions, an incoming beam passing through the edge regions will be transmitted through transformation optics 31 without reflection.

Next to the entrance aperture and the exit aperture (input and output surface areas 33A, 35A), front face 31A and back face 31B include respective third (front reflecting) and fourth (back reflecting) surface areas 33B, 35B. In the exemplary embodiment, those surface areas are coated with high reflectivity coatings 36. The coatings reflect laser beam 11A—in the illustrated example, with the exception of its first input beam segment $27_1$—at least once at front face 31A and at least once at back face 31B. The number of reflections increases with the order of beam segments 27 in y-direction. To provide for such a multiple reflection inside transformation optics 31, transformation optics 31 does not extend orthogonally to the beam propagation direction (z-direction), but instead is tilted such that the entrance aperture (input surface area 33A) is inclined with respect to the y-direction and the exit aperture (output surface area 35A) is inclined with respect to the x-direction. Common edge 32 can be considered to be a fixed point for the tilts in the two directions. The final orientation is characterized by an angle $\alpha_{eff}$ between the normal vector n of front face 31A and the normal vector n of that front face 31A when orientated perpendicular to the propagation direction.

In FIG. 4D, three exemplary optical paths 37A, 37B, 37C are illustrated for such a tilted incidence of input beam 11A onto the reflective surfaces of plate-shaped transformation optics 31. While optical path 37A does not include reflections, optical paths 37B, 37C are reflected multiple times. For an incidence angle $\alpha_{eff}$, the transformation optics 31 generates a path length difference D between neighboring beam segments corresponding to $D=2d/\cos(\alpha_{eff})$. In other words, for each additional pair of reflections, that path length difference D is added to the path of a beam segment inside beam transformation optics 31.

With increasing number of reflections (and thus with increasing order of input/re-sorted beam segment), the optical path length increases and the beam cross-section within re-sorted beam segments $29_1$ to $29_n$ decreases in sharpness due to the divergence of the beam. This can be seen in FIG. 4B in x- (and y-) direction when comparing re-sorted beam segments $29_1$ and $29_n$.

To summarize, the multiple reflection concept of input beam portions within transformation optics 31 re-sorts beam segments such that transformed beam 13A has, at the exit aperture, in the direction of its larger diameter (in the figures in x/x'-direction) a larger divergence than in the direction of its smaller diameter (in the figures in y/y'-direction). In the embodiment shown in FIGS. 4E and 4F, the multiple reflection concept is achieved by inclining the orientation of transformation optics 31 with respect to incoming laser beam 11A (11A) and by providing areas having a reflective coating (third and fourth surface areas 33B, 35B) or an anti-reflective coating (entrance/exit aperture, i.e. first and second surface areas 33A, 35A).

The beam parameter products BPP of beam 13A leaving transformation optics 31 is given in the two directions x and y, i.e., along the long dimension and short dimension of transformed beam 13A, as:

$BPP_x$(long dimension)=$BPP_{fiber}·A$ and $BPP_y$(short dimension)=$BPP_{fiber}/A$, where the parameter A corresponds to a dividing parameter of transformation unit 13 (i.e. is the number of beam segments 29 associated with transformation unit 13) and has usually values in the range from 3 to 15 or even up to 20 or more. However, an improvement of the beam parameter product may be limited to an $M^2$-value of about 2 for the short dimension due to diffraction.

Referring to FIGS. 4E and 4F, transformation optics 31 includes a low absorption, high transmission and preferably low thermal expansion materials such as fused silica. Thickness d of transformation optics 31 may be, for example, in the range from 3 mm to 20 mm. The flatness of front face 31A and back face 31B as well as their parallel orientation may be in the range of up to $\lambda/10$ or less. The anti-reflective coating may be a 99.9% transmission coating and the reflective coating may be a 99.98% reflective coating, in the spectral range, thereby providing a transmission in the range from, e.g., 99% to 99.8%.

For providing an efficient in-coupling of the beam despite the tilted configuration, the shape of input surface area 33A can be adapted to the tilted orientation. For example, the width w in the x'-direction of input surface area 33A may decrease in the y'-direction as indicated in FIG. 4E by front transition line 33T. For example, transformation optics 31 includes an acute trapezoidal shape of input surface area 33A, with the acute trapezoid having two adjacent acute angles on its longer (and in the y'-direction lower) base edge. In contrast to that, the transition between output surface area 35A and back reflection surface area 35B in the y'-direction (indicated in FIG. 4F by back transition line 35T) may be at a constant height (y'-value) to define the respective orientation of transformed radiation. The height h of output surface area 35A being configured as a rectangle is selected to be constant along the x'-direction.

In this embodiment, if the upper boarder of the rectangular exit aperture is oriented parallel to the x-z-plane and if there is a tilted orientation of the normal vector n of front face 31A at the respective angle $\alpha_{eff}$ with respect to the z-direction, then a virtual entrance aperture is created that has an effective front transition line (extending in the y-direction) with respect to the reflective region provided by front reflection surface area 33B. Furthermore, a virtual exit aperture is created that has an effective horizontal back transition line (in the x-direction) with respect to the reflective region provided by back reflection surface area 35B. Accordingly, a segmentation of incoming beam 11A into square-shaped beam segments 29 can be performed as exemplarily illustrated in FIG. 4B.

It is noted that although the illustrated exemplary embodiment indicates (anti-reflective coated) areas 33A and 35A being provided at the opposing sides, i.e., on front face 31A and back face 31B of transformation optics 31, respectively, in some embodiments those areas can be provided at the same side. A respective embodiment of a beam transformation unit 31' is illustrated in FIGS. 4G and 4H.

Figure 4G:
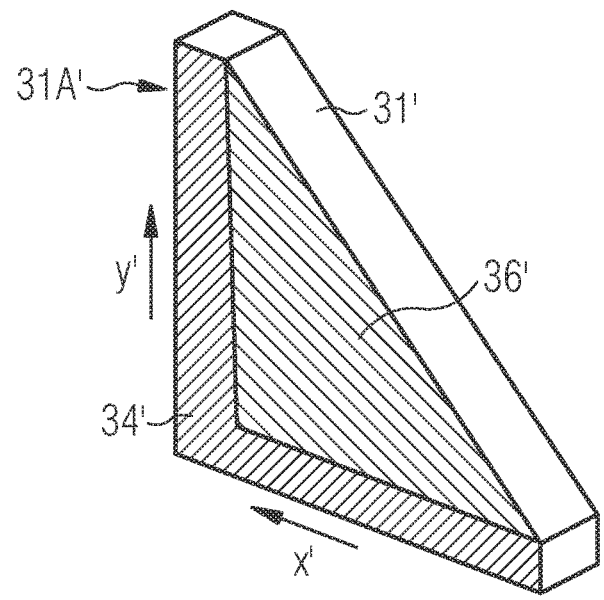
Figure 4H:
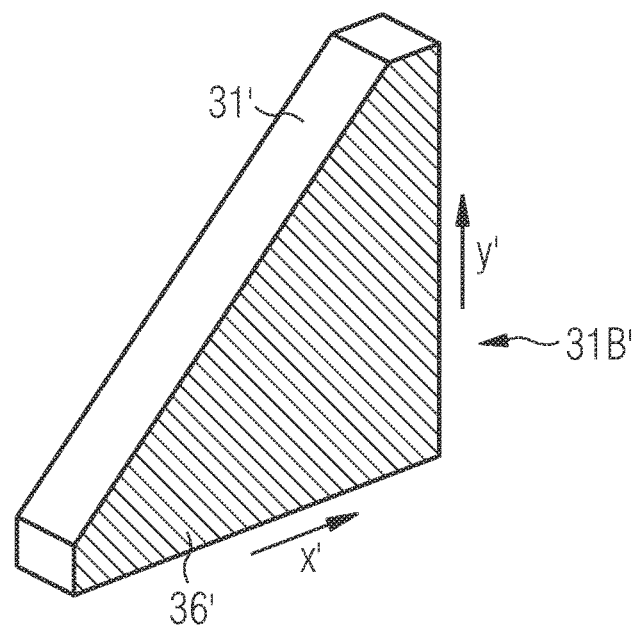

As illustrated in FIG. 4G, an entrance aperture and an exit aperture are defined by the extent of an anti-reflective coating 34' that is provided at the same side (herein referred to as front face 31A') of beam transformation unit 31' along the bottom (i.e., in the x'-direction) and the side (i.e., in the y'-direction) of the triangular-like base shape of beam transformation unit 31'. The remaining part of front face 31A' as well as back face 31B' (shown in FIG. 4H) is coated with a high reflective coating 36'. Accordingly, collimated laser beam 11A will enter and leave beam transformation unit 31' at the same side, i.e. through front face 31A'. The system, therefore, can be designed in a more compact manner.

Transformed beam 13A is homogenized in homogenization unit 15 to generate a top-hat-shaped intensity profile with high homogeneity along the long dimension (x-direction, long axis) of laser line L in the focus zone Z. Such homogenization for a single laser line L will be briefly described below in connection with FIGS. 5A and 5B and may, for example, be based on non-imaging or imaging homogenizer configurations such as the ones disclosed in the above mentioned EP 1 896 893 B1.

In some embodiments, an arraying of laser lines is performed, which requires a smooth transitioning between neighboring laser lines L, L'. This is herein referred to as "stitching" of laser lines. To improve and simplify the stitching, a non-focal concept is disclosed herein that will be explained in connection with FIGS. 6A to 6D. Furthermore, a reflective focusing configuration to further improve and simplify the stitching is disclosed in connection with FIGS. 8A to 8C. The reflective focusing configuration allows accepting the beam divergence needed for stitching several units.

In some embodiments, homogenization unit 15 may comprise a multi-lens element and a focusing element active in x-direction. Focusing in the y-direction may be further performed by a further focusing unit 17 comprising a focusing element that is active in the y-direction only (defining the line thickness in the short axis) and determines the position of the working plane to be in its focus. Thereby, in the resulting focus zone Z, an intensity distribution extending homogeneously in the x-direction is obtained, which has a large depth of focus in the y-direction.

Regarding the multi-lens element, for example, a single faceted integrator (non-imaging homogenizer) or double step faceted integrators (imaging homogenizer) can be used to form the top-hat-shape. In general, imaging homogenizers may provide a better homogeneity. The integrators may be micro lens arrays of cylinder lenses in the size range from, for example, less than 0.5 mm to 5 mm or more that are oriented to provide focusing in the x-direction. Accordingly, the pitch between micro lenses may be in the range from 0.5 mm to 5 mm such as from 0.5 mm to 4 mm. For example, the numerical aperture NA of the homogenizer may be in the range from 0.05 to 0.15.

Regarding the long axis focusing element that is active in the x-direction, a Fourier lens may be used to overlap the individual beam parts in the x-direction in the working plane. The focusing element corresponds to a one-dimensional transformation of the near field into the far field, thereby superimposing—due to the reduced coherence essentially without or with a reduced interference of the beam segments—the intensity distributions of each lens element in the focal plane. The focal length of the long axis focusing element being active in the x-direction (e.g., a Fourier lens) may be in the range from 0.5 m to 10 m. This allows generation of laser lines having a length of up to 0.5 m and more (in the long axis of the line).

In some embodiments, the focal length of the focusing element is selected smaller or larger than the distance to the working plane (e.g., 1.x to 2 times smaller or larger). Thereby, a control of the slope and a reduction of diffraction peaks at the sides (edges) of laser line L can be achieved and respective exaggeration of the intensity distribution can be avoided.

Figure 5A:
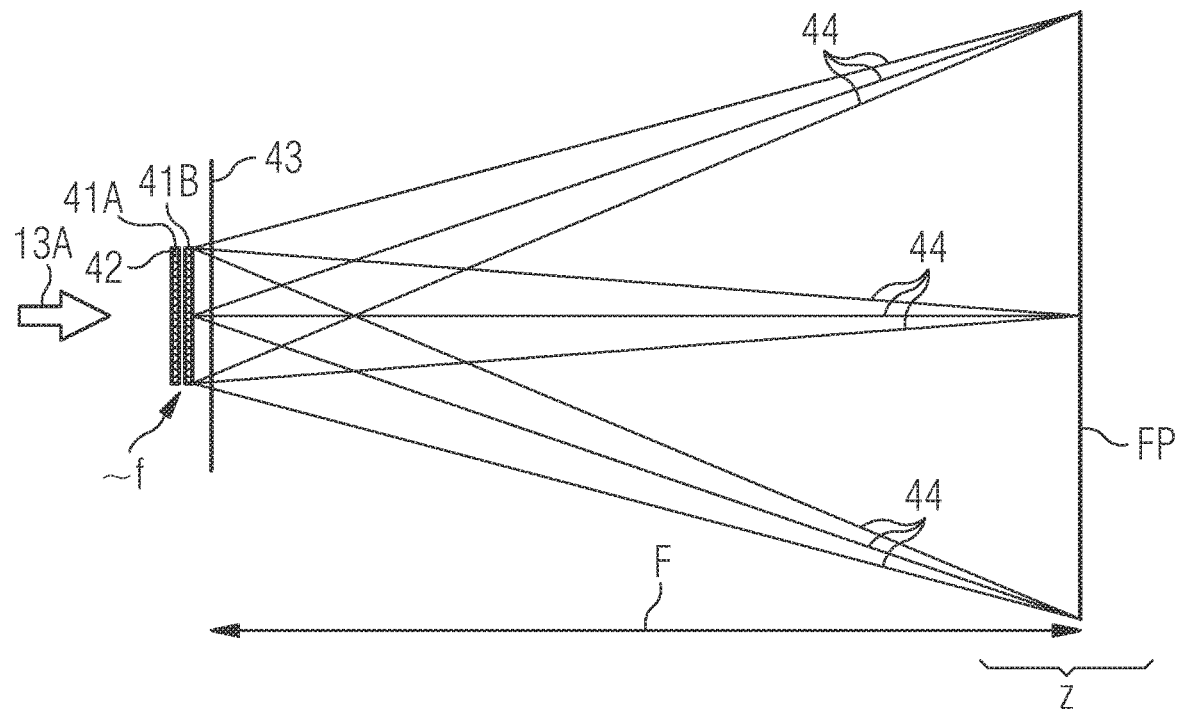
FIGS. 5A and 5B are schematic illustrations of embodiments and principles relating to beam homogenization that, for example, can be applied in the homogenization unit of FIG. 2.
Figure 5B:
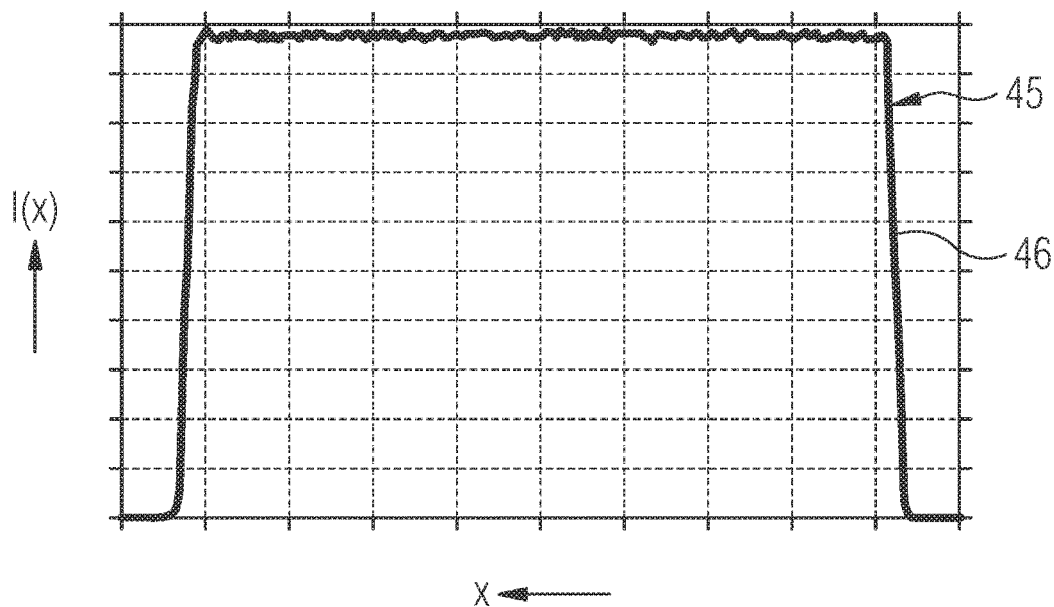

FIGS. 5A and 5B illustrate schematically an embodiment of homogenization unit 15 that includes two multi-lens elements 41A, 41B (each comprising a plurality of lens elements 42) and a Fourier lens 43. Specifically, FIG. 5A illustrates the optical elements being active in x-direction (i.e. without any focusing element of (short axis) focusing unit 17 being active in y-direction). Accordingly, multi-lens elements 41A, 41B have a, for example, common focal length f, and Fourier lens 43 has a focal length F in x-direction (long axis of the line). FIG. 5B illustrates schematically a top-hat-shape of an intensity distribution 45 in x-direction that can be achieved at a Fourier plane FP defined by focal length F of Fourier lens 43. In specific applications, Fourier plane FP may be used as a working plane in which object 7 is positioned.

It is noted that the first of the multi-lens elements 41A, 41B is located at some distance with respect to the exit aperture of transformation optics 31 such that the transformed beam 13A usually is broadened in the x- and y-directions. Moreover, each lens element 42 of first multi-lens element 41A is smaller than the broadened beam segments 29. For example, 40 lens elements 42 may cover 10 beam segments 29. For reducing any interference in the imaging homogenizer, multi-lens elements 41A, 41B may be separated by a distance larger than their common focal length f. For example, the distance between multi-lens elements 41A, 41B may be in the range from 1·f to 1.3·f. Fourier lens 43 superimposes the images of the various lens elements 42 in the focus zone, for example, in Fourier plane FP as indicated by beam lines 44.

Referring again to the top-hat-shape of intensity distribution 45 shown in FIG. 5B, side flanks 46 (herein also referred to as slopes) delimiting the extent of the top-hat-shape of the distribution are very steep corresponding to a fast drop in intensity in x-direction, e.g. a reduction in intensity to essentially 10% is achieved within less than 5 mm. This is acceptable if no stitching of multiple laser lines is performed but such a steep slope may be less suited for stitching of neighboring laser lines. As will become clear in view of the non-focal setup described below, steep slopes may be more difficult to position when a smooth transition is to be generated between the neighboring flat-top-shaped intensity distributions. Thus, in embodiments that are in particular suited for stitching, at least one of the slopes extends over at least about 5 mm and less than about 60 mm, for example, extends in the range from about 10 mm to about 40 mm.

Along the short dimension (in y-direction) of transformed beam 13A, a quasi-Gauss-type intensity distribution with FWHM of, for example, 30 µm to 100 µm can be achieved by a respective cylindrical focusing elements (exemplary configurations are discussed in connection with FIGS. 7 and 8A to 8C). The focusing element (lens or mirror) usually has a focal length of 80 mm to 200 mm and is, accordingly, positioned shortly before Fourier plane FP and extends essentially along the complete length of laser line L.

Referring to FIGS. 6A to 6D, a non-focal homogenization concept is based on the realization that displacing the working plane from the focal plane of the long axis, focusing element being active in the x-direction (e.g., from Fourier plane FP of Fourier lens 43 in FIG. 5A) decreases the slope at the lateral ends of an individual laser line L. Accordingly, a tolerance with respect to the alignment of neighboring laser lines L, L' in the x-direction is increased. Furthermore, a slope less steep leads to a wider stitching zone resulting in less critical positioning tolerances. In addition, positioning the last focusing lens away from the far field, e.g., before Fourier plane FP, may result in less diffractive effects at the edges and, thereby, allow a smoother overlap of neighboring laser lines.

Figure 6A:
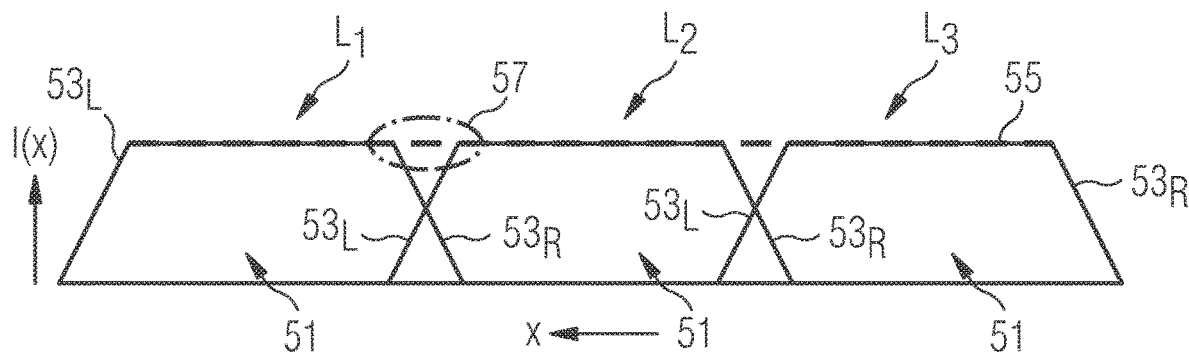
FIGS. 6A to 6D are schematic illustrations of embodiments relating to the arraying of a plurality of laser systems arranged side to side and using principles of non-focal homogenization.

Specifically, FIG. 6A illustrates the intensity distribution of laser lines used for stitching several laser lines $L_1$, $L_2$ $L_3$ generated by respective laser systems and extending in the x-direction. Each laser line $L_1$, $L_2$ $L_3$ corresponds essentially to a trapezoidal-like intensity distribution 51 in which the top-hat-shape is delimited by slopes $53_L$, $53_R$ at each side that result, for example, in an essentially linear reduction of intensity to essentially 10% within, for example, 25 mm.

Figure 6B:
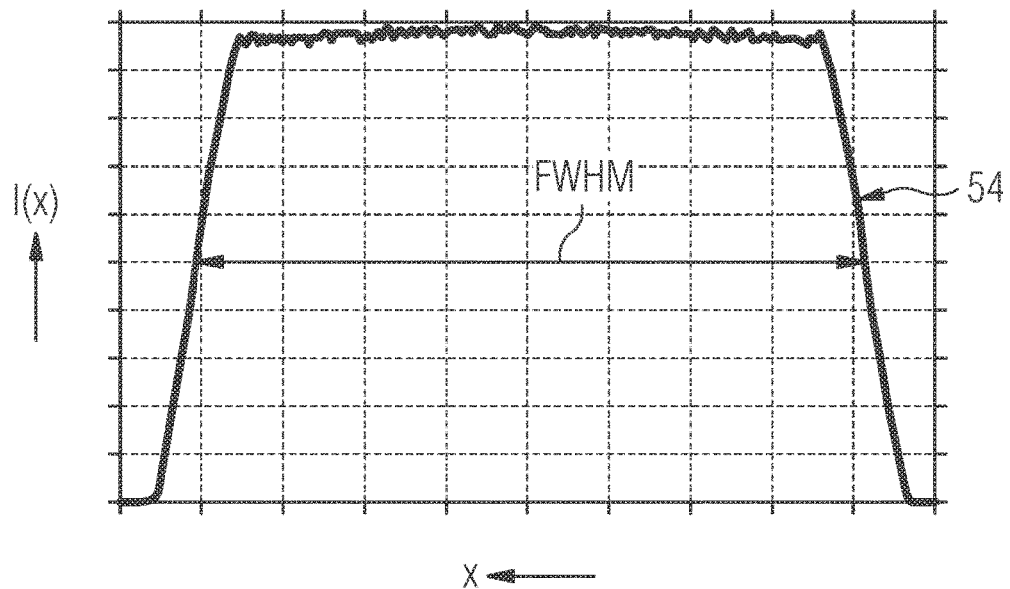

FIG. 6B illustrates schematically a top-hat-shape of an intensity distribution 54 in the x-direction that can be achieved at a respective working plane offset from the focus zone of the focusing element as will be explained in connection with FIG. 6C.

In some embodiments, the non-focal homogenization concept moves the working plane away from the focus zone of the focusing element by proper selection of focal length of the optical elements and the distances between them such that the plateau of the top-hat-profile extends at the most over 95% of the full width at half maximum FWHM of the intensity distribution. Then, a transition zone 57 as well as each slope $53_L$, $53_R$ extend over at least 2.5% or more of the FWHM of the intensity distribution, e.g. 5% or more such as 10% of the FWHM of the intensity distribution. Accordingly, the desired insensitivity with respect to the alignment in x-direction is provided.

As neighboring intensity distributions 51 overlap with essentially identical slopes $53_L$, $53_R$ but with inverse directions, a superposition of the same results in a substantially flat summarized intensity 55 as indicated with a dashed line in FIG. 6A. Modulation in transition zones 57 between neighboring intensity distributions 51 depend on the steepness of slopes $53_L$, $53_R$ and the preciseness of alignment of laser lines $L_1$, $L_2$, $L_3$ with respect to their position in the x-direction.

Figure 6C:
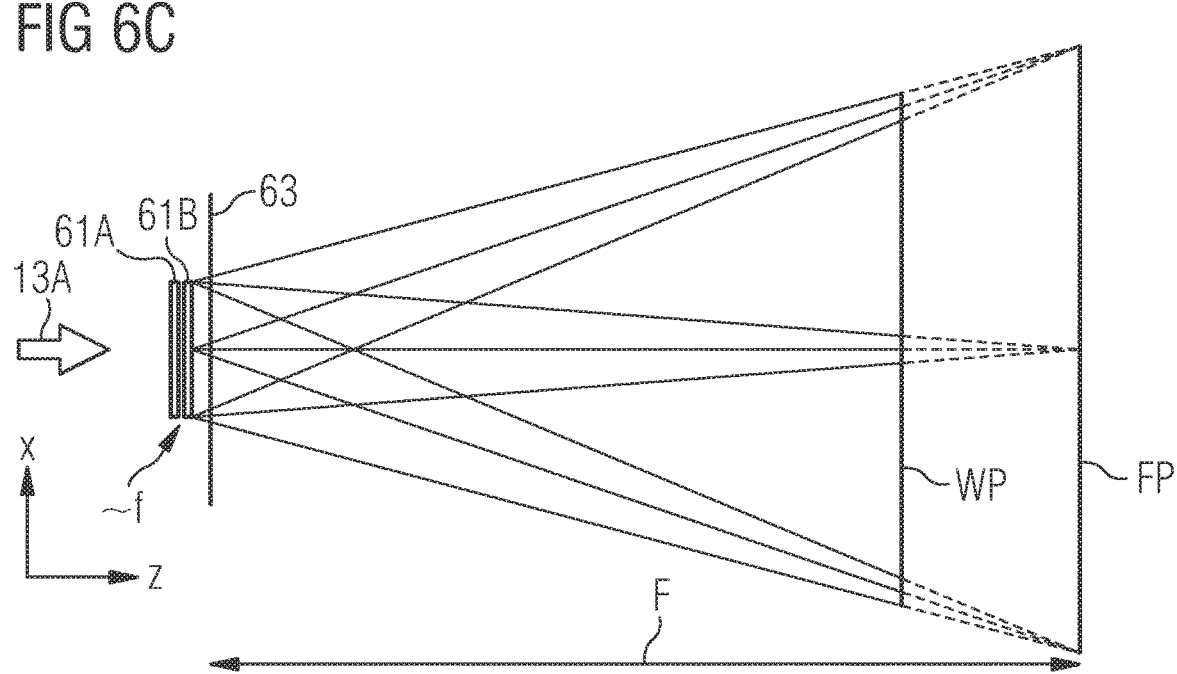
Figure 6D:
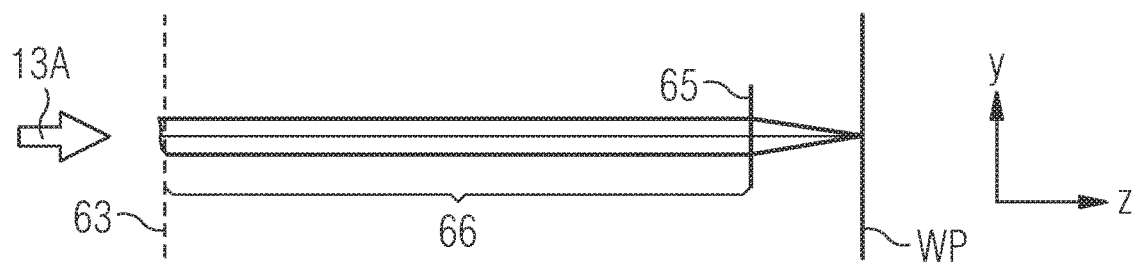

With respect to an exemplary non-focal setup implemented in a homogenization and focusing unit 60, FIG. 6C illustrates those optical elements being active in x-direction, while FIG. 6D illustrates those optical elements being active in the y-direction. Exemplarily, FIG. 6C illustrates an optical setup using an imaging homogenizer. However, it will be acknowledged that also non-imaging homogenizers can apply the underlying concept to improve stitching of laser lines $L_1$, $L_2$, $L_3$.

Referring to FIG. 6C, homogenization and focusing unit 60 includes two micro lens arrays 61A, 61B of cylinder lenses as exemplary multi-lens elements and a long axis focusing element (for example, Fourier lens 63) with a focal length F as a focusing element active in the x-direction. The micro lens arrays 61A, 61B and long axis focusing element 63 can be considered to constitute a homogenization unit similar to the configuration shown in FIG. 5A. Although herein long axis focusing element 63 is referred to as a Fourier lens, in principle also reflective configurations may be implemented.

Referring to FIG. 6D, homogenization and focusing unit 60 includes further a short axis focusing element 65 that is active in the y-direction.

Short axis focusing element 65 extends essentially across the magnified beam as provided by micro lens arrays 61A, 61B and Fourier lens 63. Short axis focusing element 65 usually has a focal length $f_y$ that is significantly smaller than focal length F such as 1% to 10% of focal length F. For example, focal length F may be about 2000 mm and focal length $f_y$ may be in the range from 80 mm to 250 mm, e.g. about 150 mm.

Short axis focusing element 65 may comprise a (cylindrical) focusing lens and/or a (cylindrical) focusing mirror that are aligned to be active in the y-direction (only, i.e., essentially not active in the x-direction, e.g., with the cylinder axis in the y-direction) or pluralities of those optical elements.

In an exemplary embodiment shown in FIG. 7, short axis focusing element 65 is configured as a parabolic reflector 70. Parabolic reflector 70 has a high reflective surface 71 that has a parabolic shape in the y-z-plane to focus the laser beam under, for example, an angle of 90° at a distance of focal length $f_y$ in the short axis direction along the elongated shape of the laser beam.

A further embodiment of short axis focusing element 65 using reflective cylinder optics will be illustrated below in connection with FIGS. 8A to 8C.

Referring again to FIGS. 6C and 6D, to decrease the slope at the sides of each top-hat-shaped intensity distribution and thereby to allow the specific stitching of laser lines as disclosed herein, short axis focusing element 65 is arranged at a non-focal distance 66 from Fourier lens 63 (indicated in FIG. 6D by a dashed line), for example, in the range from 20% to 90% or in the range 120% to 200% of focal length F. More specifically, the position of short axis focusing element 65 deviates from a position of the short axis focusing element 65 that would be required to position the focus of Fourier lens 63 and the focus of short axis focusing element 65 in the same plane. For example, short axis focusing element 65 is positioned at a distance of 0.5·F from Fourier lens 63. Such a position of short axis focusing element 65 will result in a position of a working plane WP that differs from the position of Fourier plane FP of Fourier lens 63 by about 55% of focal length F. The difference in position is sufficient to decrease the side slopes in a way suited for stitching the intensity distributions of two neighboring laser systems 1, 1'.

In other words, working plane WP has a distance from Fourier lens 63 that is in the range from about 30% to 80% or 130% to 180% of focal length F. Based thereon and knowing focal length $f_y$ of short axis focusing element 65, the position of short axis focusing element 65 with respect to Fourier lens 63 can be determined to fall, for example, in the range given above.

As an example of short axis focusing element 65, FIGS. 8A to 8C illustrate an optical focusing system 80 that allows focusing incoming laser light in the y-direction and thereby providing a line focus with a line length ll (in the drawings in the x-direction) at working plane WP. Line length ll includes, in reference to FIG. 6A, full width at half maximum FWHM and the remaining two halves of transition zones 57 at each side.

Optical focusing system 80 is specifically designed to provide a line length ll that extends at least at one end beyond a lateral system width ws of optical focusing system 80. System width ws is usually given by the size of a housing 83 encompassing optical focusing system 80. Usually, housing 83 has an exit window 85 through which the laser light exits onto an object 87 (e.g., object 7 in FIG. 1) to be irradiated. Object 87 is positioned, e.g., on top of a mount 89 (e.g., mount 9 in FIG. 1). Optical focusing system 80 and/or mount 89 may be mounted to one or more multi-axis robots such as a hexapod robot (not shown) to allow for proper orientation of the laser line on object 87.

Figure 9:
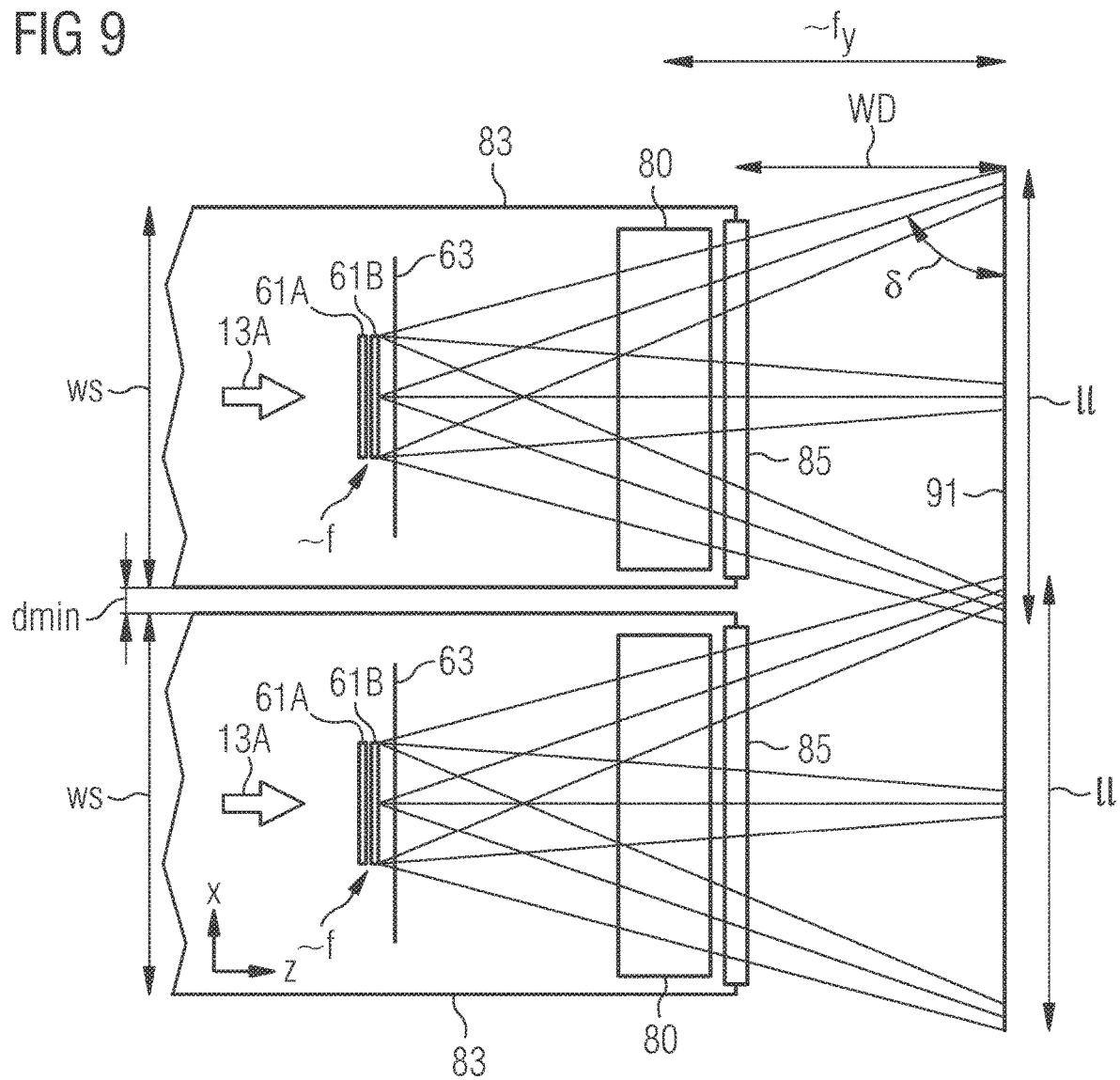
FIG. 9 is a schematic illustration of two laser systems positioned side to side for forming a combined (stitched) laser line.

Having a line length ll extending beyond the system allows stitching of laser lines and thereby generating a continuous laser line 91 by simply positioning housings 83 of essentially identical optical focusing systems 80 next to each other, as it is illustrated in FIG. 9. Adapting each line length ll and the slopes (as well as the emitted light intensity of each laser system) then allows forming continuous laser line 91 with a homogeneous intensity as illustrated in FIG. 6A.

In FIG. 9, a divergence in the x-direction of the beam forming the laser line (segments) is indicated by an angle δ. This beam divergence allows being able to position laser systems side to side. The required minimum distance dmin between housings 83 and a distance from exit window 85 to working plane WP (herein referred to as free working distance WD) define that angle δ.

However, due to the beam divergence required, focusing with a cylindrical lens is not feasible because of the inclined incidence angle of the beam at the outer ends of the cylindrical lens, which would result in focus aberrations.

In contrast, the configuration of optical focusing system 80 illustrated in FIGS. 8A to 8C is less sensitive to those focus aberrations. Optical focusing system 80 includes a set of two cylinder mirrors for affecting the beam convergence in the y-direction, the cylinder axes of the cylinder mirrors extending in x-direction. Specifically, downstream of Fourier lens 63, a beam 93 is formed that is collimated in the y-direction and divergent in the x-direction. A diverging (convex) cylindrical mirror 95A (with radius R1<0) reflects beam 93 under an angle β out of the X-Z-plane onto a focusing (concave) cylindrical mirror 95B (with radius R2>0) that is mounted at a distance l2 from diverging (convex) cylindrical mirror 95A. Focusing power of the two cylinder mirrors is selected such that working plane WP is at a distance l1 from focusing (concave) cylindrical mirror 95B, whereby focusing (concave) cylindrical mirror 95B reflects beam 93 under an angle γ. Depending on angle γ, exiting beam 93A (corresponding to radiation beam 5A in FIG. 1) may propagate under an angle with respect to the x-z-plane.

An optical path length modifying unit may provide a further folding of the optical beam path and, in general, the laser system may be pre-positioned or freely positionable with respect to object 87 to ensure the desired incidence angle ε. Incidence angle ε is indicated exemplarily in FIG. 8C with respect to a surface normal n of object 87 extending e.g., in a plane.

Exemplary parameter values include for the angle β, a range from about 40° to about 60° and for the angle γ, a range from about 20° to about 30°. The optical focusing system 80 may have a combined focusing power (fy) of the two cylinder mirrors in a range from 90 mm to 300 mm, resulting, e.g., in a distance l1 in a range from about 200 mm to about 1200 mm and distance l2 in a range from about 70 mm to about 400 mm. Those parameter ranges further correspond to ratios β/γ in a range from about 1.7 to about 2.3 and an absolute value of a ratio of the curvatures of the two cylinder mirrors R1/R2 in a range from about 1.6 to about 2.1 (e.g., for R1=410 mm and R2=230 mm, the curvature being in the y-z-plane shown in FIG. 8C, while there is essentially a linear extension in the x-direction). For example, the parameters, fy, l2, and β are independent parameters that can be selected in view of the specific application of the laser system.

As can be seen in FIG. 8C, in particular diverging (convex) cylindrical mirror 95A is positioned close to working plane WP such that housing 83 usually will cover that mirror and provide exit window 85 at about the same distance to working plane 83, thereby defining free working distance WD between optical focusing system 80 and object 87 or working plane WP. Exemplary values for free working distance WD are in the range from e.g. about 10 mm to about 1000 mm.

Optical focusing system 80 provides a diffraction limited focusing in the y-direction using purely cylindrical components. This is—in comparison to parabolic mirrors—cost effective. In addition, the reflective design has no or less coupling aberrations (compared to lens embodiments) and provides a very high transmission of beam 93.

To stitch laser lines, the embodiments disclosed herein allow having a certain beam divergence of each line in the x-direction, such that neighboring housings do not collide. A corresponding limiting condition for stitching can be identified as the FWHM-line length FWHM (in the working plane) to be the same as or larger than the width ws of housing 83. It was realized by the inventors that due to the line divergence in x-direction, lens based telecentric designs may have disadvantages that can be reduced or even avoided by using reflective focusing.

Accordingly, the homogenization and focusing unit, and for example, Fourier lens 63, is configured to provide the required minimum divergence. In general, that required beam divergence depends on free working distance WD, desired FWHM-line length FWHM, and the desired length of transition zone(s) 57. For example, angle δ can be approximated as being proportional to the ratio of FWHM-line length FWHM and the free working distance WD.

The above-mentioned need to adapt line length ll of stitched laser lines can be addressed by an optical path length modifying unit 100 that is configured for adapting the optical path length between Fourier lens 63 and optical focusing system 80. Within optical path length modifying unit 100, the beam is, for example, collimated in the y-direction, but it is divergent in the x-direction. Then, optical path length modifying unit 100 includes, for example, a beam folding configuration having a folding mirror 101 positioned on a translation stage (indicated by an arrow 103). Accordingly, when moving the folding mirror, the optical path within optical path length modifying unit 100 can be extended and the line length ll will increase, and vice versa. FIG. 8A illustrates the setting of a long optical path length in optical path length modifying unit 100 by continuous lines and the setting of a short optical path length by dash-dotted lines.

It is noted that at least some of the aspects disclosed herein, e.g., relating to the homogenization (and for example, the stitching of laser lines), may also be implemented in known laser systems for line shape illumination that, e.g., use a transformation optics known in the art instead of a monolithic plate-shaped, optical element as disclosed herein in connection with FIGS. 4C to 4H. Moreover, the short dimension focusing system illustrated in FIGS. 8A to 8C can also be implemented in known laser systems for line shape illumination to provide for the specific stitching shape and/or extent of the laser line.

In this respect, a homogenization and focusing unit (for homogenizing an elongated laser beam to form a laser line extending in a first direction to be used, for example, in an arrangement of laser systems for line illumination of an object) may comprise: a focusing unit including a short axis focusing element that is active in a second direction, thereby defining the position of the working plane of the laser line in a propagation direction of the laser beam at its focal plane; and a homogenization unit configured to superimpose portions of the elongated laser beam arranged in the first direction along the elongated laser beam at a focal plane of the homogenization unit, wherein the beam is divergent in the first direction between the homogenization unit and the focusing unit.

A divergent beam allows stitching of laser lines generated by homogenization and focusing units that are positioned side by side, because each laser line can extend at the working plane beyond any structural component of the respective homogenization and focusing unit.

In some embodiments, the homogenization and focusing unit further includes an optical path length modifying unit positioned between the homogenization unit and the focusing unit, wherein the optical path length modifying unit is configured for adapting the optical path length between the homogenization unit and the focusing unit. Changing the optical path length affects the line length of the laser line at the working plane, because the beam being divergent in the first direction will spread out more (or less), while the position of the working plane is maintained. In some embodiments, the optical path length modifying unit includes a beam folding configuration having a folding mirror positioned on a translation stage. Moving the position of the folding mirror with the translation stage will change the optical path length within the optical path length modifying unit and, thus, between the homogenization unit and the focusing unit.

In the examples of embodiments disclosed herein, reference was made to coordinates x, y, and z. The skilled person will appreciate that those coordinates may refer to orthogonal coordinate systems that relate to respective parts of the system and beam propagation direction but that, due to folding of the optical beam path, may not be aligned to a common orthogonal coordinate system. In general, the x- and y-directions can be considered to be orthogonal to the actual propagation direction (z-direction) and orthogonal with respect to each other.

Among the present embodiments, a beam transformation device for transforming an input laser beam into a transformed beam with reduced spatial or temporal coherence, or both, is disclosed. The beam transformation unit includes a transformation optics (31) including a transparent monolithic plate-shaped optical element that has a front face (31A) and a back face (31B). The front face extends essentially in parallel to the back face and is separated from the back face by a distance (d). The front face includes an input surface area and a front reflecting surface area. The input surface area is configured to receive input laser beams and extending in an elongated manner in a pre-transformed direction (y') next to the front reflecting surface area. The back face comprises an output surface area and a back reflecting surface area. The output surface area is configured to output the transformed laser beam and extending in an elongated manner in a transformed direction (x') next to the back reflecting surface area, wherein the transformed direction (x') differs from the pre-transformed direction (y'). The front reflecting surface area and the back reflecting surface area are configured to reflect a plurality of input beam segments of the input laser beam that have entered the transformation optics through the input surface area, to guide the plurality of input beam segments to exit as a plurality of output beam segments of the transformed laser beam through the output surface area. Each input beam segment of the plurality of input beam segments undergoes a respective number of reflections from the front and the back reflecting surface areas before the input beam segment exits through the output surface area. Neighboring input beam segments that undergo different numbers of reflections are re-sorted into different output beam segments, thereby providing different optical path lengths to the output beam segments inside the beam transformation optics.

In some embodiments, the distance (d) is at least 0.5 mm. In some embodiments, the input surface area (33A) and the output surface area (35A) are arranged such that, when the input laser beam (11A) enters the input surface area (33A) under a tilt angle ($\alpha_{eff}$) with respect to a normal vector (n) of the front face (31A). The input beam segments (27) are arranged essentially in the pre-transformed direction (y') are re-sorted as output beam segments (29) arranged essentially in the transformed direction (x').

In some embodiments, the beam transformation device includes one or more reflective coatings (36) that cover at least part of the front reflecting surface area (33B) and at least part of the back reflecting surface area, to provide the reflective configuration of the beam transformation device at the front reflecting surface area (33B) and the back reflecting surface area (35B). The reflective coating can be a dielectric coating. Some embodiments include an anti-reflective coating that covers at least part of the input surface area and at least a part of the output surface area. The anti-reflective coating can be a dielectric coating.

The pre-transformed direction (y') and the transformed direction (x') can extend essentially orthogonally with respect to each other.

In some embodiments, the input surface area (33A) has an elongated shape and extends along a linear front transition line (33T) between the input surface area (33A) and the front reflective surface area (33B). The output surface area (35A) has an elongated shape, and extends along a linear back transition line (35T) between the output surface area and the back reflective surface area. An orientation of the linear front transition line (33T) with respect to the linear back transition line (35T) is at an angle smaller than 90°. In some examples, at least one of the input surface area and the output surface area is rectangular. In some embodiments, the orientation of the linear front transition line with respect to the linear back transition line is adapted to a tilt angle ($\alpha_{eff}$) when the input laser beam enters the input surface area under the tilt angle ($\alpha_{eff}$) with respect to a normal vector (n) of the front face.

In some embodiments, at least one of the front reflective surface area (33B) and/or the back reflective surface area (35B) has a triangular-like shape that has a longest side, the front reflective surface area being adjacent to the input surface area along a linear front transition line, the back reflective surface area being adjacent to the output surface area along a linear back transition line, and each of the linear front transition line and the linear back transition line differ from respective longest side of a respective triangular-like shape.

Among the embodiments disclosed herein is a laser system for providing a transformed beam (13A) with reduced spatial or temporal coherence, or both. The laser system includes a laser source (3) for providing a laser beam (3A) as an input laser beam (11A) propagating along a propagation direction (z), and a beam transformation unit (13) that includes a transformation optics (31). The transformation optics includes a transparent monolithic plate-shaped optical element that has a front face (31A) and a back face (31B) that extends essentially in parallel to the front face, wherein the front face is separated from the back face by a distance (d). The front face (31A) includes an input surface area configured to receive the input laser beam (33A). The back face (31B) includes an output surface area configured to output a transformed laser beam. The transformation unit is oriented with respect to propagation direction (z) such that the input laser beam enters the input surface area under a tilt angle ($\alpha_{eff}$) with respect to a normal vector (n) of the front face, wherein the tilt angle ($\alpha_{eff}$) is selected such that the input laser beam enters the transformation optics through the input surface area and is guided by reflection at a front reflecting surface area of the front face and at a back reflecting surface area of the back face within the transformation optics to exit as the transformed laser beam through the output surface area. The input beam includes a plurality of input beam segments and the transformed beam comprises a plurality of output beam segments. Neighboring input beam segments that undergo different numbers of reflections (27) are re-sorted into different output beam segments (29), thereby providing different optical path lengths to the output beam segments (29). In some examples, the distance (d) is at least 0.5 mm.

In some embodiments, the transformed beam is illuminated as a laser line extending in a first direction (x). The system can include an anamorphic collimation unit (11) for shaping the laser beam (11A) of the laser source (3) to be elongated along a second direction (y) that differs from the first direction (x). The second direction (y) can be orthogonal to the first direction (x).

In some embodiments, the laser source (3) is configured to generate at least one of a continuous-wave mode and pulsed mode laser light radiation and in a wavelength range extending from the (near) ultraviolet to the (near) infrared.

The system can further include at least one further laser source providing at least one further laser beam that together with the laser beam form the input laser beam (11A).

Some laser systems disclosed herein are for laser processing of an object (7) with a combination of stitched laser lines (L, L'). These systems can include an optical path length modifying unit (100) positioned in an optical path of the laser beam (13A) between the homogenization unit (15) and the focusing unit (17) and configured to adapting an optical path length between the homogenization unit (15) and the focusing unit (17). In some embodiments, the optical path length modifying unit (100) comprises a beam folding configuration having a folding mirror (101) positioned on a translation stage, wherein the folding configuration is configured such that moving the position of the folding mirror (101) along the translation stage changes the optical path length within the optical path length modifying unit (100) and, thereby, between the homogenization unit and the focusing unit.

Methods for stitching laser lines (L, L') to form a stitched laser line extending in a first direction (x), is also disclosed. Some methods include adapting at least one of optical path lengths between a respective long axis focusing element (43) and a respective short axis focusing element (65) so that the line lengths (ll) of the laser lines (L, L') are such that the slopes overlap within the transition zone (57). Some methods include positioning an object (7) at the common working plane (WP), and irradiating the object (7) with the stitched laser line, while performing a relative movement of the object (7) with respect to the stitched laser line.

Embodiments disclosed herein include a homogenization and focusing unit (60) for adapting a length of a laser line (L) formed by an elongated laser beam (13A), the laser line (L) extending in a first direction (x). The homogenization and focusing unit (60) includes a homogenization unit (15) configured to superimpose portions of the elongated laser beam (13A) arranged in the first direction (x) along the elongated laser beam (13A) at a focal plane (FP) of the homogenization unit (15). The homogenization and focusing unit (60) also includes a focusing unit (17) including a short axis focusing element (65) that is active in a second direction (y), wherein a focal plane of the short axis focusing element defines a position of a working plane (WP) of the laser line (L) in a propagation direction (z) of the laser beam (13A). The laser beam (13A) is divergent in the first direction (x) between the homogenization unit (15) and the focusing unit.

In some embodiments, the optical path length modifying unit (100) includes a beam folding configuration having a folding mirror (101) positioned on a translation stage, wherein the folding configuration is configured such that moving the position of the folding mirror (101) along the translation stage changes the optical path length within the optical path length modifying unit (100) and, thereby, between the homogenization unit and the focusing unit.

Although some embodiments of this invention have been described herein, improvements and modifications may be incorporated without departing from the scope of the following claims.

What is claimed is:

1. A homogenization and focusing unit for homogenizing an elongated laser beam to form a laser line (L) extending in a first direction (x), the homogenization and focusing unit comprising:
   a focusing unit comprising a short axis focusing element that is active in a second direction (y), wherein a focal plane of the focusing element defines a position of a working plane (WP) of the laser line (L) in a propagation direction (z) of the elongated laser beam; and
   a homogenization unit comprising one or more lenses to superimpose portions of the elongated laser beam arranged in the first direction (x) along the elongated laser beam at a focal plane (FP) of the homogenization unit,
   wherein the focal plane of the focusing element is selected such that the position of the working plane (WP) in the propagation direction (z) differs from a position of the focal plane (FP) of the homogenization unit such that an intensity distribution of the laser line (L) along the first direction (x) comprises a top-hat-shape with a plateau that is delimited by slopes at each side.

2. The homogenization and focusing unit of claim 1, wherein the homogenization unit comprises:
   at least one multi-lens element extending in the first direction (x) and being active in the first direction (x); and
   a long axis focusing element that is active in the first direction (x) to superimpose individual beam parts associated with respective lenses of the multi-lens element in the first direction (x) in a focal plane of the long axis focusing element.

3. The homogenization and focusing unit of claim 2, wherein the working plane (WP) has a distance from the long axis focusing element that is in a range from 30% to 80% or 130% to 180% of a focal length (F) of the long axis focusing element.

4. The homogenization and focusing unit of claim 2, wherein
   the long axis focusing element has a focus length (F), the short axis focusing element is positioned at a non-focal distance from the homogenization unit, and the short axis focusing element is positioned within a range from 20% to 90% and 120% to 200% of the focus length (F) from the long axis focusing element.

5. The homogenization and focusing unit of claim 1, wherein the homogenization unit comprises two multi-lens elements extending in the first direction (x) and being active in the first direction (x) and the multi-lens elements have a common focal length (f) and are separated in a beam propagation direction (z) by a distance larger than the common focal length (f).

6. The homogenization and focusing unit of claim 1, wherein the short axis focusing element comprises reflective cylindrical optical elements configured to provide a folded optical path and a common focal length (f).

7. The homogenization and focusing unit of claim 6, wherein the reflective cylindrical optical elements comprise a convex cylindrical mirror and a concave cylindrical mirror, each of the convex and the concave cylindrical mirrors having a respective cylinder axis extending in the first direction (x).

8. The homogenization and focusing unit of claim 1, further comprising:

an optical path length modifying unit that comprises a mirror and is positioned in an optical path of the laser beam between the homogenization unit and the focusing unit and configured to adapt an optical path length between the homogenization unit and the focusing unit.

9. The homogenization and focusing unit of claim 8, wherein the optical path length modifying unit comprises a beam folding configuration comprising the mirror, wherein the mirror is a folding mirror positioned on a translation stage, and wherein the beam folding configuration is configured such that moving the position of the folding mirror along the translation stage changes the optical path length within the optical path length modifying unit and between the homogenization unit and the focusing unit.

10. A laser system for providing a laser line (L) in a working plane (WP) for line illumination of an object, the laser line (L) extending in a first direction (x) over a significant length and in a second direction (y) over a small extent, the laser system comprising:

a laser source for providing a laser beam as basis for an elongated input laser beam propagating along a propagation direction (z); and a homogenization and focusing unit for homogenizing the elongated laser beam to form the laser line (L), wherein the homogenization and focusing unit comprises a focusing unit comprising a short axis focusing element that is active in the second direction (y), wherein a focal plane of the focusing element defines a position of a working plane (WP) of the laser line (L) in the propagation direction (z) of the laser beam, and a homogenization unit comprising one or more lenses to superimpose portions of the elongated laser beam arranged in the first direction (x) along the elongated laser beam at a focal plane (FP) of the homogenization unit, wherein the focal plane of the focusing element is selected such that the position of the working plane (WP) in the propagation direction (z) differs from a position of the focal plane (FP) of the homogenization unit such that an intensity distribution of the laser line (L) along the first direction (x) comprises a top-hat-shape with a plateau that is delimited by slopes at each side.

11. The laser system of claim 10, further comprising at least one of:

a transformation unit for transforming the laser beam of the laser source into the elongated laser beam, or an anamorphic collimation unit for shaping the laser beam of the laser source to be elongated along the first or the second direction (x, y), wherein the transformation unit comprises a transformation optics comprising a transparent monolithic plate-shaped optical element that has a front face and a back face, the front face extending in parallel to the back face and being separated from the back face by a distance (d), wherein the front face comprises an input surface area and a front reflecting surface area, the input surface area being configured to receive input laser beams and extending in an elongated manner in a pre-transformed direction (y') next to the front reflecting surface area, and the back face comprises an output surface area and a back reflecting surface area, the output surface area being configured to output the transformed laser beam and extending in an elongated manner in a transformed direction (x') next to the back reflecting surface area, the transformed direction (x') differing from the pre-transformed direction (y'), wherein the front reflecting surface area and the back reflecting surface area are configured to reflect a plurality of input beam segments of the input laser beam that have entered the transformation optics through the input surface area, to guide the plurality of input beam segments to exit as a plurality of output beam segments of the transformed laser beam through the output surface area, wherein each input beam segment of the plurality of input beam segments undergoes a respective number of reflections from the front and the back reflecting surface areas before the input beam segment exits through the output surface area, and wherein neighboring input beam segments that undergo different numbers of reflections are re-sorted into different output beam segments.

12. The laser system of claim 10, wherein at least one of the slopes extends for at least 5 mm and for less than 60 mm.

13. The laser system of claim 10, wherein the homogenization unit is configured to provide, at the focusing unit, a beam that is divergent in the first direction (x), wherein a beam divergence of the beam is selected such that the laser line (L) has a line length (ll) at the working plane (WP) that is larger than an extent of the short axis focusing element in the first direction (x), or a full width at half maximum (FWHM) of the intensity distribution at the working plane (WP) in the first direction (x) is at least as large as an extension of the short axis focusing element in the first direction (x).

14. A combined laser system for laser processing of an object with a combination of stitched laser lines, the combined laser system comprising a plurality of essentially identical laser systems as recited in claim 10, wherein neighboring laser systems are displaced in the first direction (x) at least by a distance corresponding to widths of neighboring slopes of respective intensity distributions of respective neighboring laser systems so that overlaying neighboring slopes in respective transition zones of respective neighboring laser systems form an extended laser line with a flat summarized intensity in the first direction (x).

15. The combined laser system of claim 14, wherein each of the neighboring laser systems is configured to output a laser beam that is divergent in the first direction (x) in which the laser line (L) extends,
- wherein the divergence is selected such that the laser line (L) has a line length (ll) at the working plane (WP) that is larger than an extent of the short axis focusing element in the direction (x) or
- a full width at half maximum (FWHM) of the intensity distribution of the laser line (L) is at least as large as an extension of the short axis focusing element in the first direction (x) of the respective laser system.

16. The combined laser system of claim 14, wherein, for each of the laser systems, the laser beam is divergent in the first direction (x) between the homogenization unit and the focusing unit and a divergence of the laser beam is selected such that the laser line (L) extends at the working plane (WP) in the first direction (x) beyond any projection of any structural component of the homogenization and focusing unit onto the working plane (WP) and wherein the divergence of the laser beam is selected for stitching the laser line (L) with another laser line (L') generated by another homogenization and focusing unit that is positioned side by side of the homogenization and focusing unit.

17. The combined laser system of claim 14, wherein each of the laser systems further comprises:
- an optical path length modifying unit positioned in an optical path of the laser beam between the homogenization unit and the focusing unit and configured to adapt an optical path length between the homogenization unit and the focusing unit.

18. The combined laser system of claim 17, wherein adapting the optical path length affects the line length (ll) of the laser line (L) at the working plane (WP) due to a divergence of the laser beam in the first direction (x), wherein the position of the working plane (WP) is essentially maintained.

19. A method for stitching laser lines (L, L') to form a stitched laser line extending in a first direction (x), the method comprising:
- for at least two elongated laser beams,
  - superimposing portions of respective elongated laser beams arranged in the first direction (x) at a focal plane (FP) using a long axis focusing element comprising one or more first lenses that are active in the first direction (x),
  - focusing each elongated laser beam in a second direction (y) by using a short axis focusing element that comprises one or more second lenses that are active in the second direction (y) and define, in a propagation direction (z), a working plane (WP) within a respective focus zone of the one or more second lenses in the second direction (y), wherein a position of the working plane (WP) in the propagation direction (z) is selected to differ from a position of the focal plane (FP); and
- aligning the at least two elongated laser beams side by side in the first direction (x) to form, in the working planes (WP), the stitched laser line with a summarized intensity.

20. The method of claim 19, wherein the positions of respective working planes (WP) of the at least two elongated laser beams are selected such that each intensity distribution of the respective laser lines (L, L') comprises a top-hat-shape having a plateau that is delimited by slopes at each side, and
- wherein aligning the at least two elongated laser beams includes overlapping the slopes of neighboring laser lines, such that in a transition zone of the elongated laser beams, an intensity distribution comparable to the intensity distribution within the plateau is reached, by adapting at least one of the optical path lengths between a respective long axis focusing element and a respective short axis focusing element.

* * * * *